US008788587B2

(12) United States Patent
Balassanian et al.

(10) Patent No.: US 8,788,587 B2
(45) Date of Patent: Jul. 22, 2014

(54) SYSTEM, METHOD, AND PRODUCT FOR CAPTURING MEMORIES

(71) Applicant: Be Labs, LLC, Seattle, WA (US)

(72) Inventors: Edward Balassanian, Seattle, WA (US); Damon Ganem, Seattle, WA (US)

(73) Assignee: Be Labs, LLC, Seattle, WA (US)

( * ) Notice: Subject to any disclaimer, the term of this patent is extended or adjusted under 35 U.S.C. 154(b) by 0 days.

(21) Appl. No.: 13/918,727

(22) Filed: Jun. 14, 2013

(65) Prior Publication Data

US 2013/0339446 A1    Dec. 19, 2013

Related U.S. Application Data

(60) Provisional application No. 61/660,124, filed on Jun. 15, 2012, provisional application No. 61/666,123, filed on Jun. 29, 2012.

(51) Int. Cl.
*G06F 15/16*    (2006.01)

(52) U.S. Cl.
USPC .......................................... 709/204; 709/205

(58) Field of Classification Search
USPC ............... 709/200–205, 217–227, 228, 229
See application file for complete search history.

(56) References Cited

U.S. PATENT DOCUMENTS

| 7,770,004 | B2* | 8/2010 | Herf et al. ..................... 713/162 |
| 8,358,358 | B2* | 1/2013 | Gallagher et al. .......... 348/231.5 |
| 2008/0086475 | A1* | 4/2008 | Kane .................................. 707/9 |
| 2010/0211575 | A1* | 8/2010 | Collins et al. ................. 707/749 |
| 2011/0099478 | A1* | 4/2011 | Gallagher et al. ............. 715/735 |
| 2012/0036132 | A1* | 2/2012 | Doyle ........................... 707/738 |
| 2012/0096084 | A1* | 4/2012 | Grigsby et al. ............... 709/204 |
| 2013/0018960 | A1* | 1/2013 | Knysz et al. ................... 709/204 |
| 2013/0038756 | A1* | 2/2013 | Cheng ...................... 348/231.99 |
| 2013/0166640 | A1* | 6/2013 | Wilfert et al. ................ 709/204 |

OTHER PUBLICATIONS

International Search Report and Written Opinion in Application No. PCT/US13/46031 mailed Sep. 19, 2013, 8 pages.

* cited by examiner

*Primary Examiner* — Moustafa M Meky

(74) *Attorney, Agent, or Firm* — Meyertons, Hood, Kivlin, Kowert & Goetzel, P.C.

(57) ABSTRACT

The present disclosure relates to a allowing individuals to create and share digital memories, which may include, e.g., picture, video, text, audio, and drawings captured through a mobile device. Those memories may in some embodiments be associated with other individuals located at the same location and time. This disclosure further relates to a mobile application that allows users to create digital memories, share memories with others, and discover memories of which they were a part. The mobile application, systems and interactions are herein referred to generally as "Timeline." Timeline may be viewed as focused on users in the physical world rather than online world.

20 Claims, 28 Drawing Sheets

SYSTEM, METHOD, AND PRODUCT FOR CAPTURING MEMORIES

CROSS REFERENCE TO RELATED APPLICATIONS

The present application claims the benefit of and priority to Provisional Application No. 61/660,124, filed on Jun. 15, 2012, and Provisional Application No. 61/666,123, filed Jun. 29, 2012. Both of these applications are hereby incorporated by reference in their entirety for all purposes.

SUMMARY

The present disclosure relates to a web service for individuals to create digital memories, which may include, e.g., picture, video, text, audio, and drawings captured through a mobile device at a specific location in the real world. Memories may generally be referred to as "data" or "data associated with an experience of a user." Those memories may in some embodiments be associated with other individuals located at the same location and time.

The present disclosure relates to a mobile application that allows users to create digital memories, share memories with others, and discover memories of which they were a part. The mobile application, systems and interactions are herein referred to generally as "Timeline." Timeline may be viewed as focused on users in the physical world rather than online world. This has several implications. Timeline is an example of an information sharing service. The teachings of the present disclosure may be applied to other information sharing services as well.

For example, Timeline is in some embodiments primarily a mobile experience—mobile phones are typically with users when they are moving about in the physical world. This is where they create memories and have real interactions with other people and places.

Further, the Timeline application doesn't necessarily create an alternate world—users do not necessarily create arbitrary lists of friends, nor do users create a personality independent of their real world personality. Timeline represents users in the real world and identifies users' natural connections with people and places.

Timeline may be useful for users who, for example, own smart phones and want to capture memories in a digital form (e.g., in photos and videos). Users can create memories anywhere, for example in public, in private, and/or in groups.

Users may create memories when, for example, they have their phones in their possession. Further, they may create memories when they would naturally want to capture a memory utilizing one of, but not limited to, a camera, a video camera, a note taking device, or an audio capture device.

Users may utilize the Timeline application to (but not limited to) share memories, revisit and resurface memories, capture memories, express themselves, and/or leave memories behind (nostalgia).

Timeline may utilize user-generated memories to (but not limited to) generate intuitive intersections of people with places and other people and/or resurface memories based on people/place/time.

In some embodiments of this disclosure, various differences with respect to existing solutions may be observed. For example, existing social networking applications or websites (e.g., Facebook) encourage users to create digital memories which involve people they don't interact with in the real world (e.g., people far away from them). Timeline allows users to create digital memories which involve the people they interact with in the real world (e.g., people close to them).

The focus of Timeline on connecting real people with real memories in the real world may have several advantages. For example, Timeline may know who users interact with, the places they interact (both private and public), and when memories are created (and how this correlates to other aspects of a user's life).

Accordingly, a number of revenue opportunities may present themselves. By allowing brands to target specific behavior patterns in natural ways while consumers are in the physical world, Timeline can enable a new level of brand-consumer connection. This may especially be the case with the lifestyle indicators that may be collected including mood, weather, etc.

For example, a particular user may tend to create the happiest memories when it is sunny, he is in Los Angeles, and it is between the hours of 2 pm and 4 pm. Brands interested in selling products to consumers predisposed to these traits could leverage this data. Public walls may also be used, which serve as memorials in places that are attractive to consumers and brands alike. For example, tourist locations, large retail venues, public arenas, and branded venues (e.g. brands may create their own walls for the ultimate in brick-and-mortar tie in).

Walls may provide multiple revenue opportunities. For example, brands can sponsor walls. In addition, brands can be incorporated into game dynamics on walls—e.g., a user may post on a wall and in response receive a coupon to a local merchant. Since an explicit action may be required from the user (e.g. post on a wall) and since the action is tied to being physically located at a venue, follow-through with the brand-sponsored message may be more significant.

Another revenue opportunity might be to allow users to opt-in to being tagged by brands in some embodiments. For example, a user might be at a store. The salesperson could tag the user at the store along with a picture and a coupon for a discount from the store. Now that the user is connected with the store, the store could tag him in additional deals even when he is not in the store. The user may be able to decline the tag or accept it, in which case it will be added to his timeline. The tag may include any form of promotion, since memories may include various types of data.

The ability for Timeline to resurface memories is a powerful tool for the brand tagging model. If you visit a store, you are tagged. You accept the tag. Then the memory is in your timeline. The next time you visit the store, the memory may be resurfaced. The store can then generate new memories that include tags for all their opt-in customers with the location set accordingly (e.g. you receive a tag for the particular store location you are closest to). An automated system for brick and mortar stores may be used, such that tags are automatically generated when customers walk in.

Brands may also register with Timeline and identify themselves as brands. Once identified as being associated with the legitimate owner of the brand, the brand may access special features of Timeline. For example, brands may access a "fans" feature when creating memories. For example, when fans go to an artist's concert, the artist may create a memory such as a live recording of the concert, and then tag everyone in attendance with the memory. All users may then receive the memory and have the option to accept the tag. Once they accept it, they may have the memory in their Timeline and the artist may have them in his contacts.

Likewise, any fans at the concert may tag the artist. When they create a memory, the artist may show up as one of the possible tags in a special "brands" tag that shows nearby brands that can be tagged. This may allow fans to share their memories with a brand. The brand can have "accept all" turned on for any memories that are shared with them. Alternatively they may have "review before accepting" turned on. The brand's Timeline may then include memories created by their fans. Brands may be able to publish their Timelines on the information sharing service of the present disclosure, or on (for example) some other website.

This disclosure may advantageously exploit the confluence of contexts, connections, and location. What is meant by these terms is as follows.

Connections are other users whom you have phone numbers for. In the context of this disclosure, shared phone numbers are viewed as a useful measure of whether two people are "connected."

Contexts capture the types of connections that users want to interact with. There are various types of possible contexts, such as all connections, recent connections, nearby connections, etc.

Locations of users may be tracked on the server. The client may send locations to server as regularly as possible ensuring the server has the most complete view of who users are, where they are, and the contexts they are participating in.

At any given time, the server may know where all users are, who their connections are, and which contexts they have enabled. New contexts can be created to support different models of interacting. Likewise, the client may know which specific context a user is interested in interacting with (e.g. nearby users versus all contacts).

BRIEF DESCRIPTION OF THE DRAWINGS

A more complete understanding of the present disclosed system and method may be obtained by reference to the accompanying drawings, when considered in conjunction with the subsequent, detailed description, in which.

DETAILED DESCRIPTION

Figure 1:
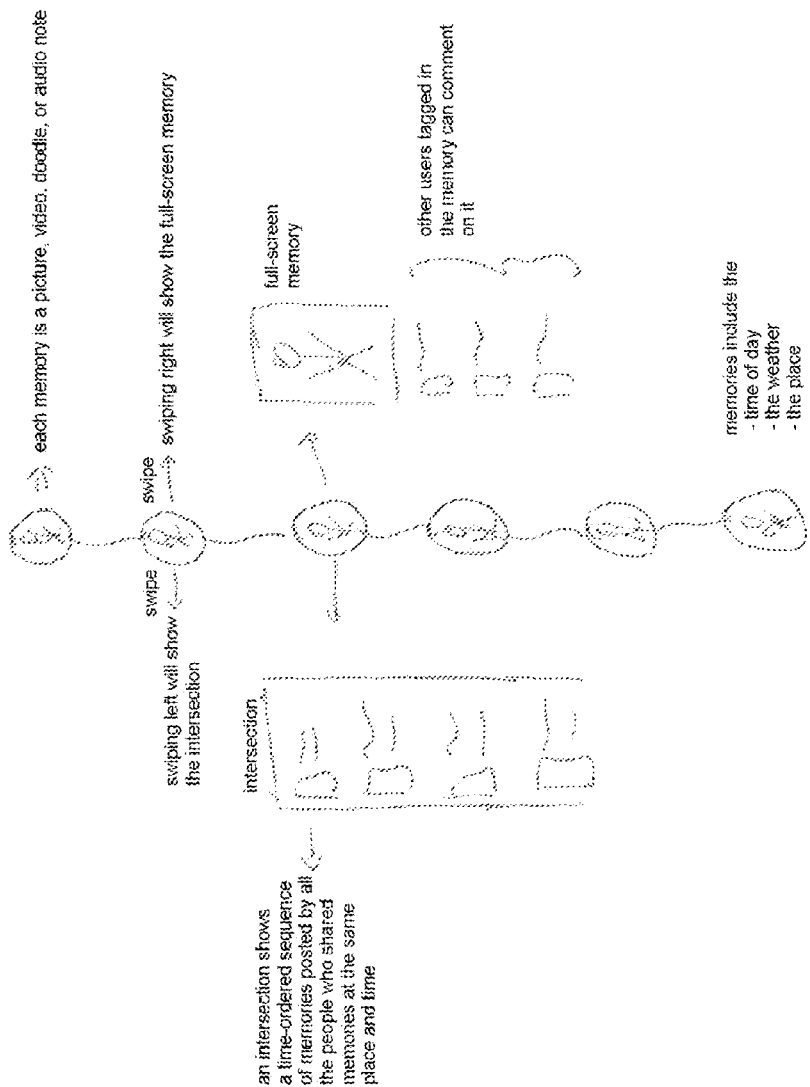
FIG. 1 is an illustration describing a technique to associate one or more memories.
Figure 2:
FIG. 2 is an illustration of an example mobile application interface showing a timeline of memories.
Figure 3:
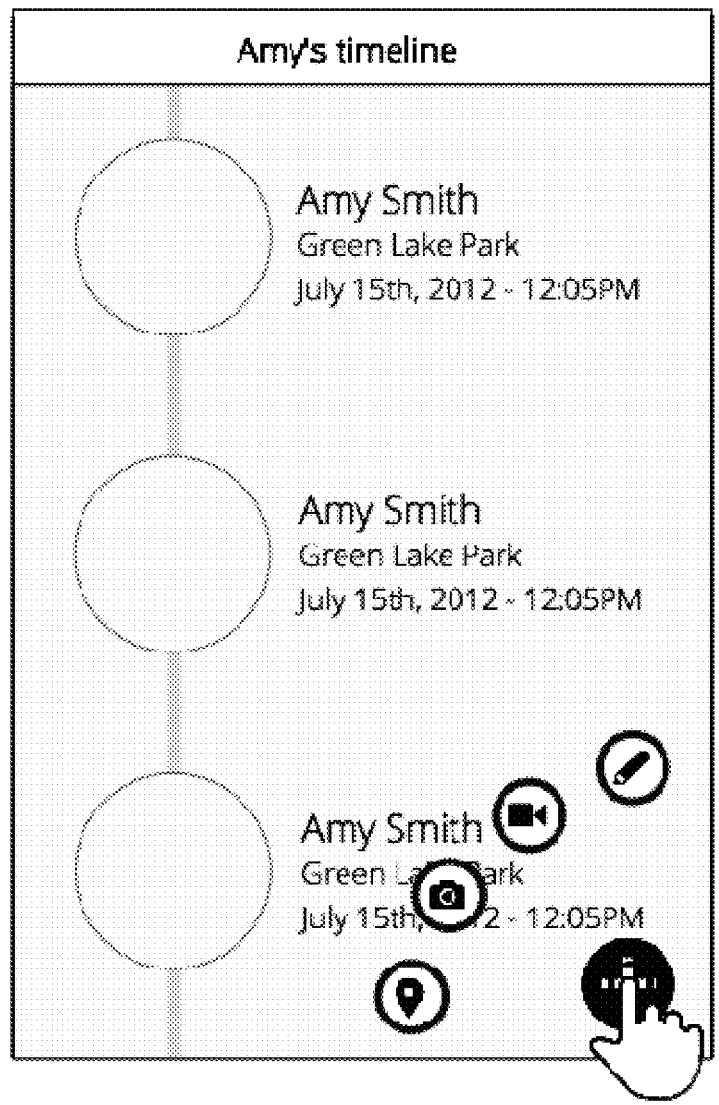
FIG. 3 is an illustration of an example mobile application interface to record a memory.
Figure 4:
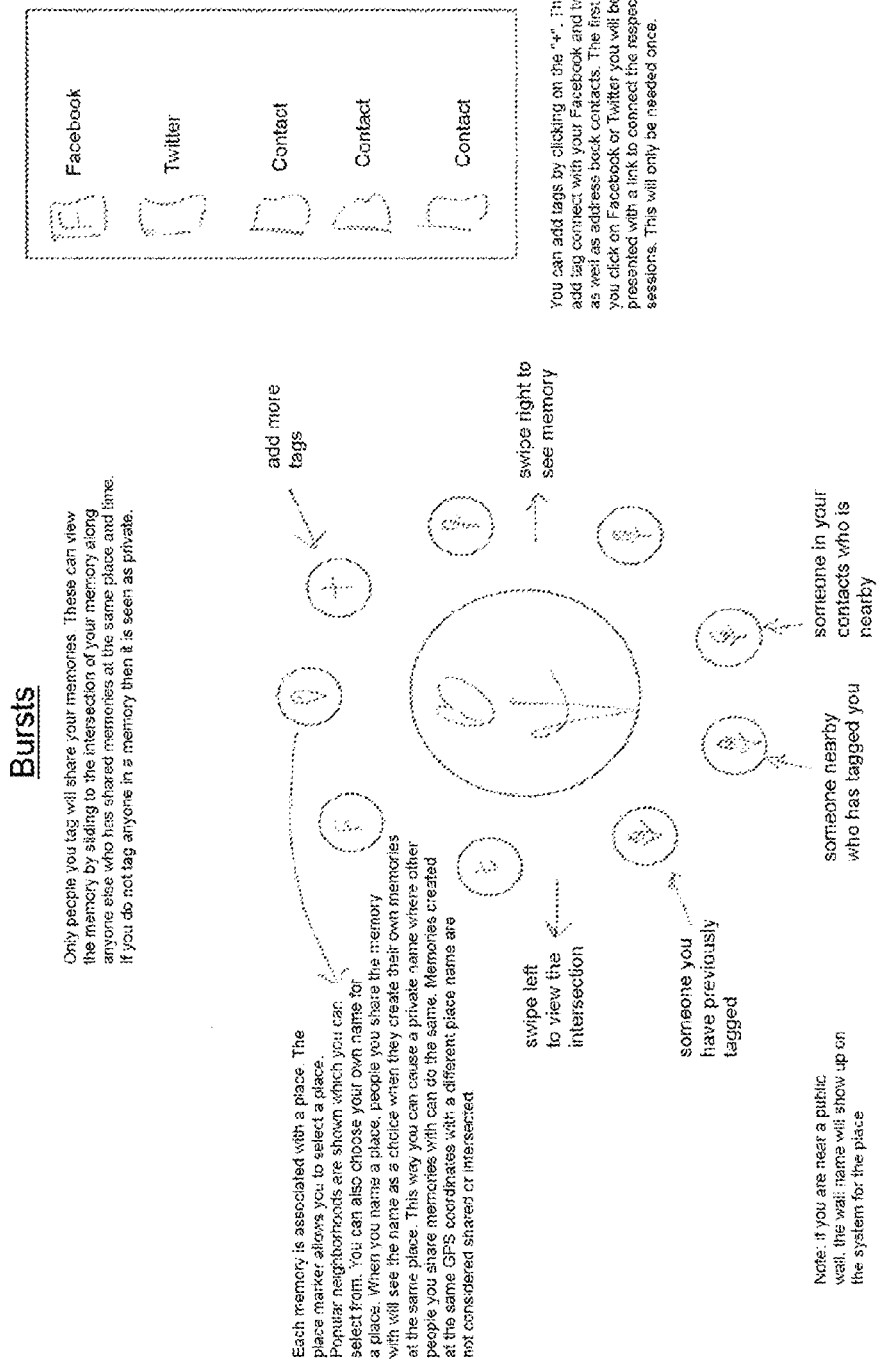
FIG. 4 is an illustration describing techniques to associate information with a given memory.
Figure 5:
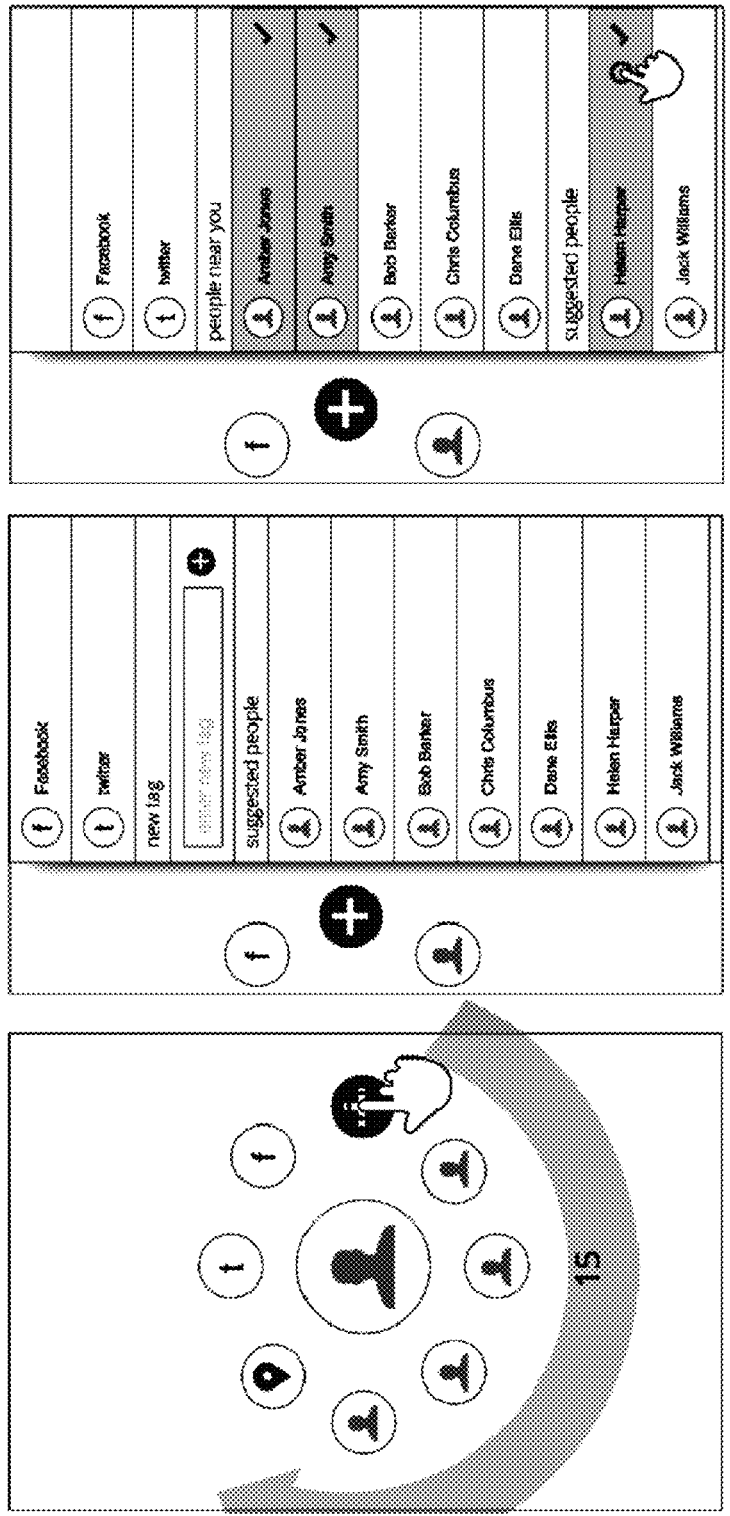
FIG. 5 is an illustration of an example mobile application interface to associate individuals with a given memory.
Figure 6:
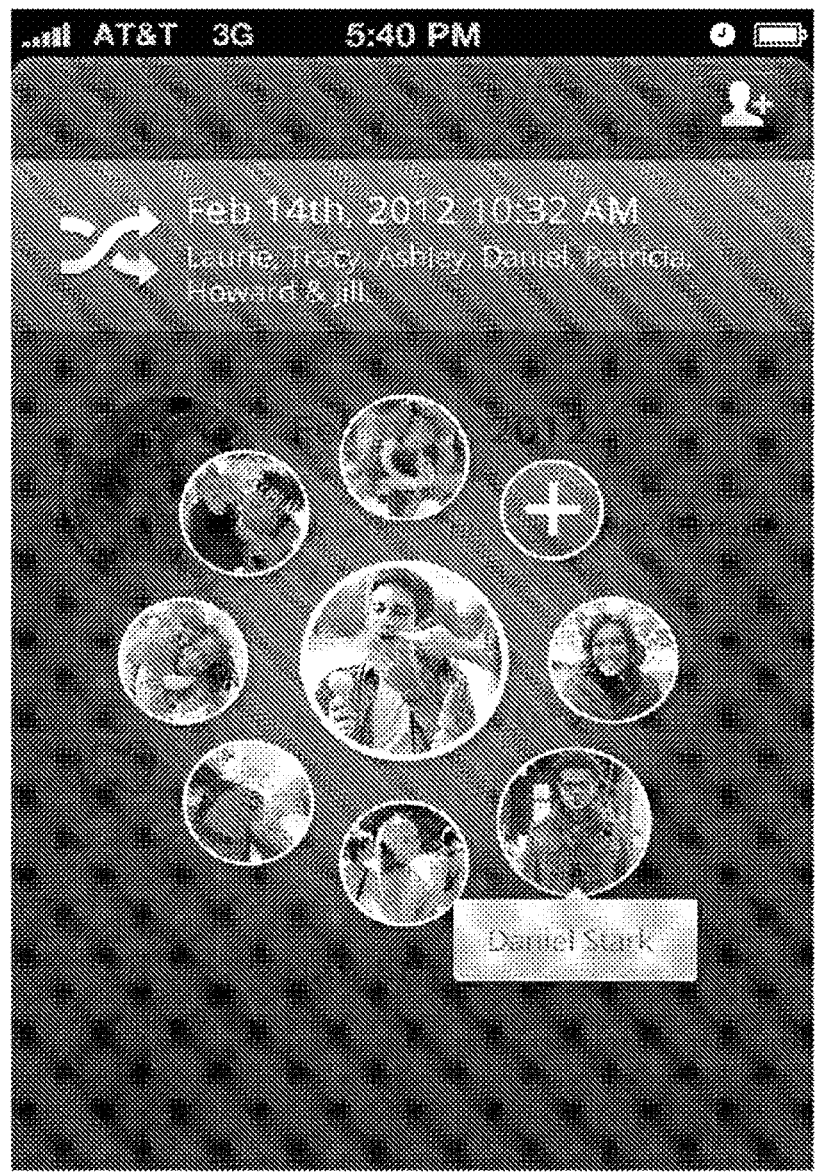
FIG. 6 is an illustration of an example mobile application interface to view individual associated with a given memory.
Figure 7:
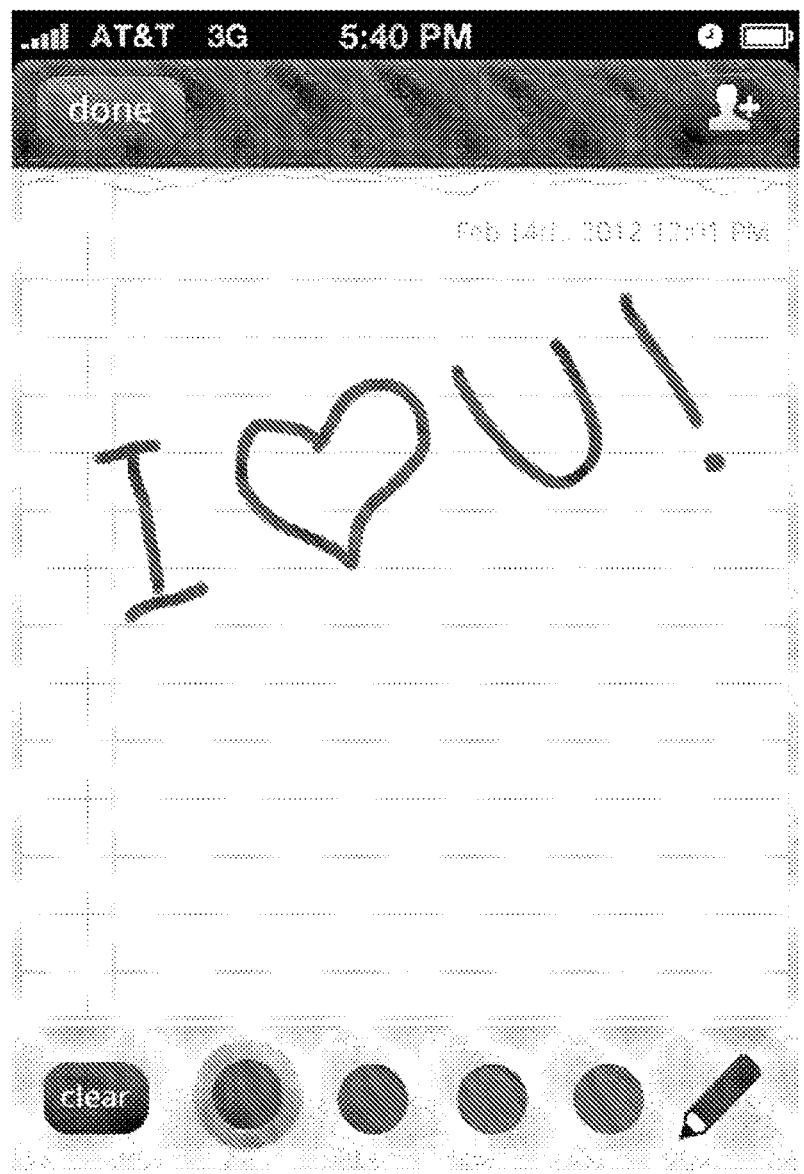
FIG. 7 is an illustration of an example mobile application interface to capture a note in association with a given memory.
Figure 8:
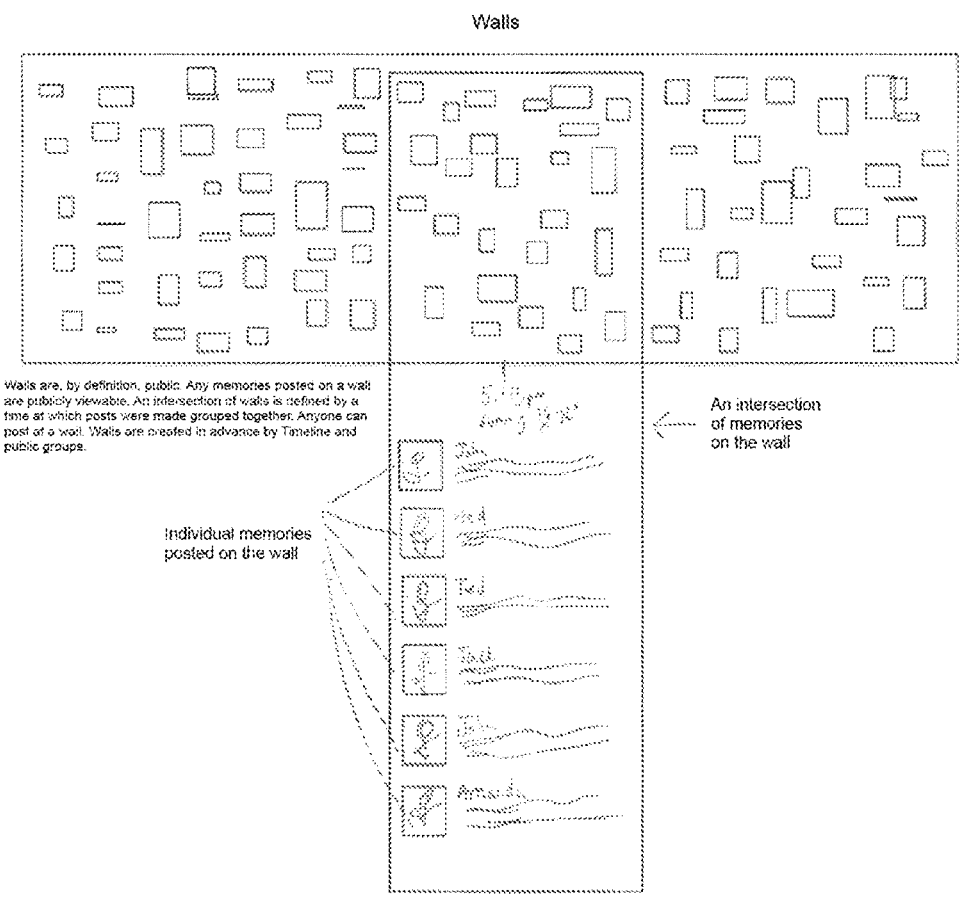
FIG. 8 is an illustration describing techniques of displaying a virtual wall and associating individuals with the virtual wall.
Figure 9:
FIG. 9 is an illustration of an example mobile application interface of a virtual wall.
Figure 10:
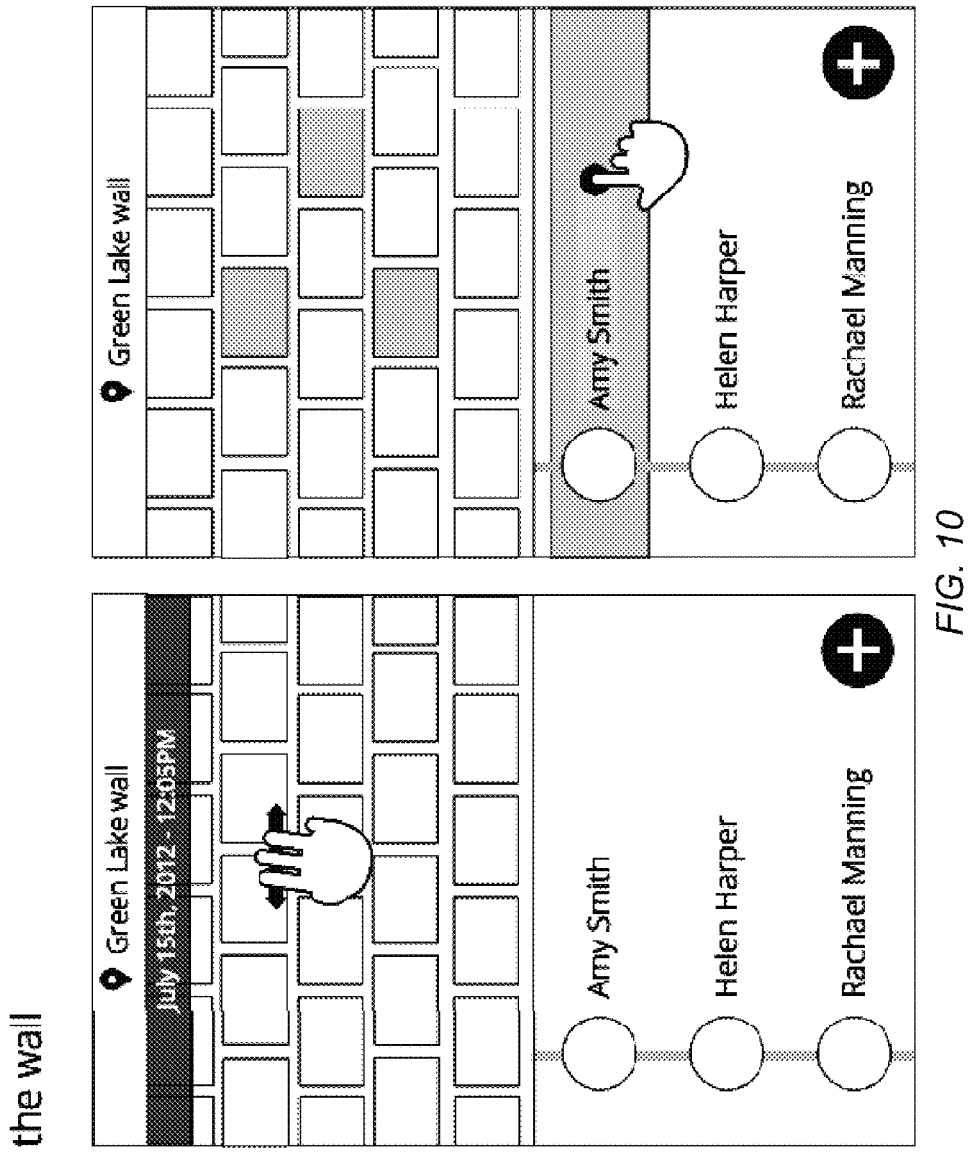
FIG. 10 is an illustration of an example mobile application interface navigating a virtual wall.
Figure 11:
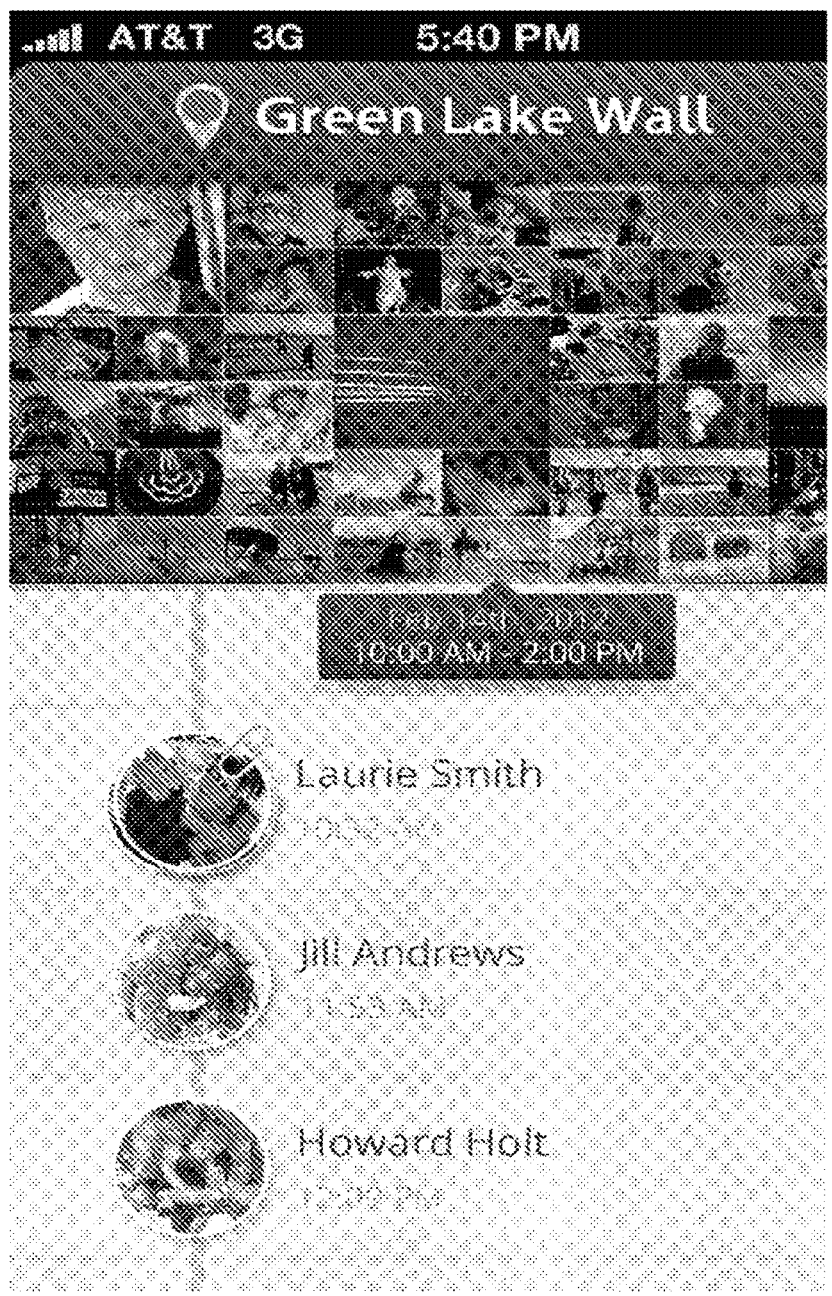
FIG. 11 is an illustration of an example mobile application interface of individuals associated with a virtual wall.
Figure 12:
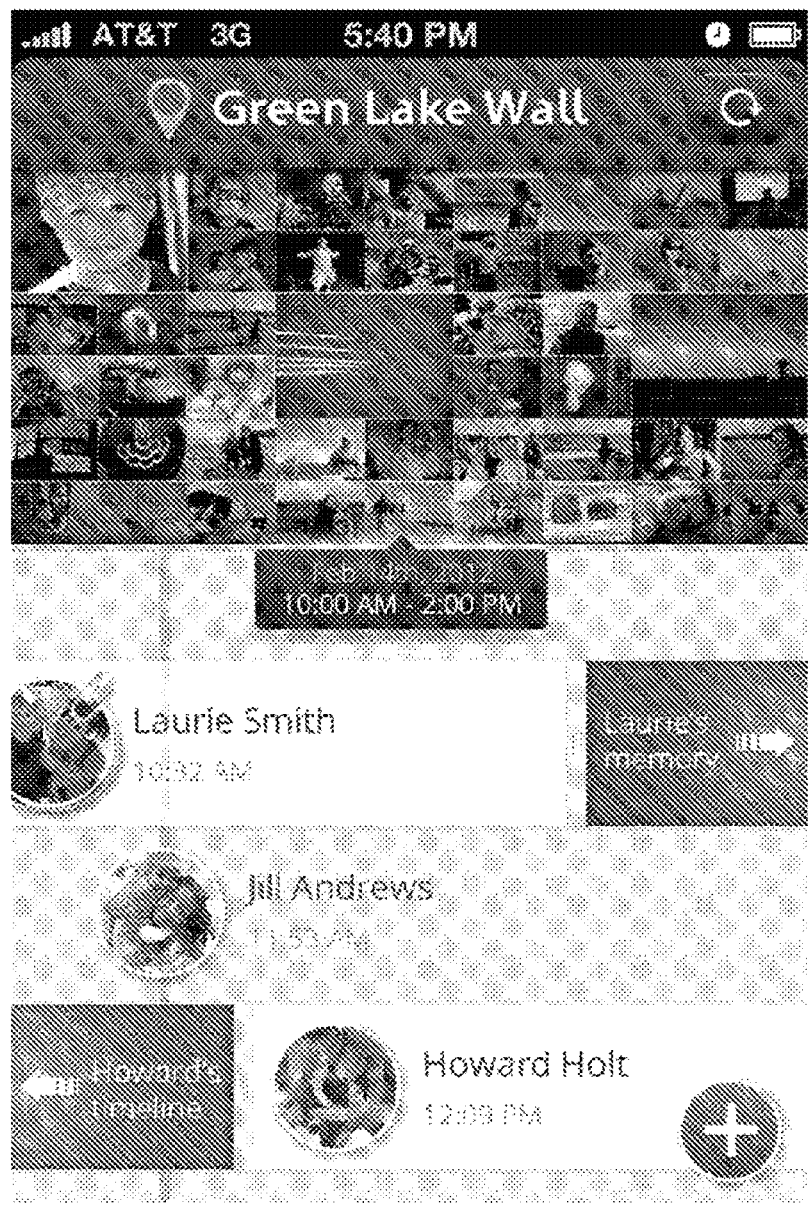
FIG. 12 is an illustration of an example mobile application interface for viewing additional details about the individuals associated with a virtual wall.
Figure 13:
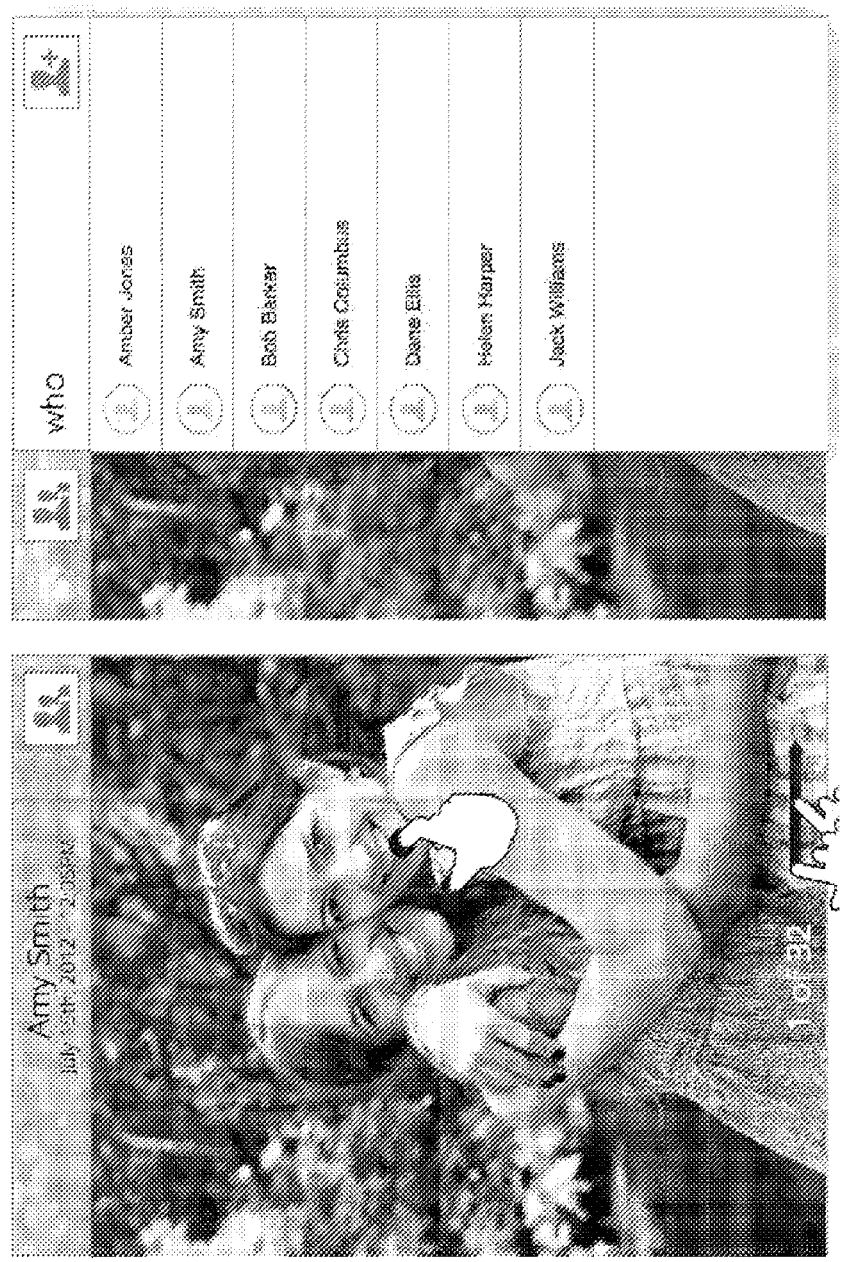
FIG. 13 is an illustration of an example mobile application interface of a memory.
Figure 14:
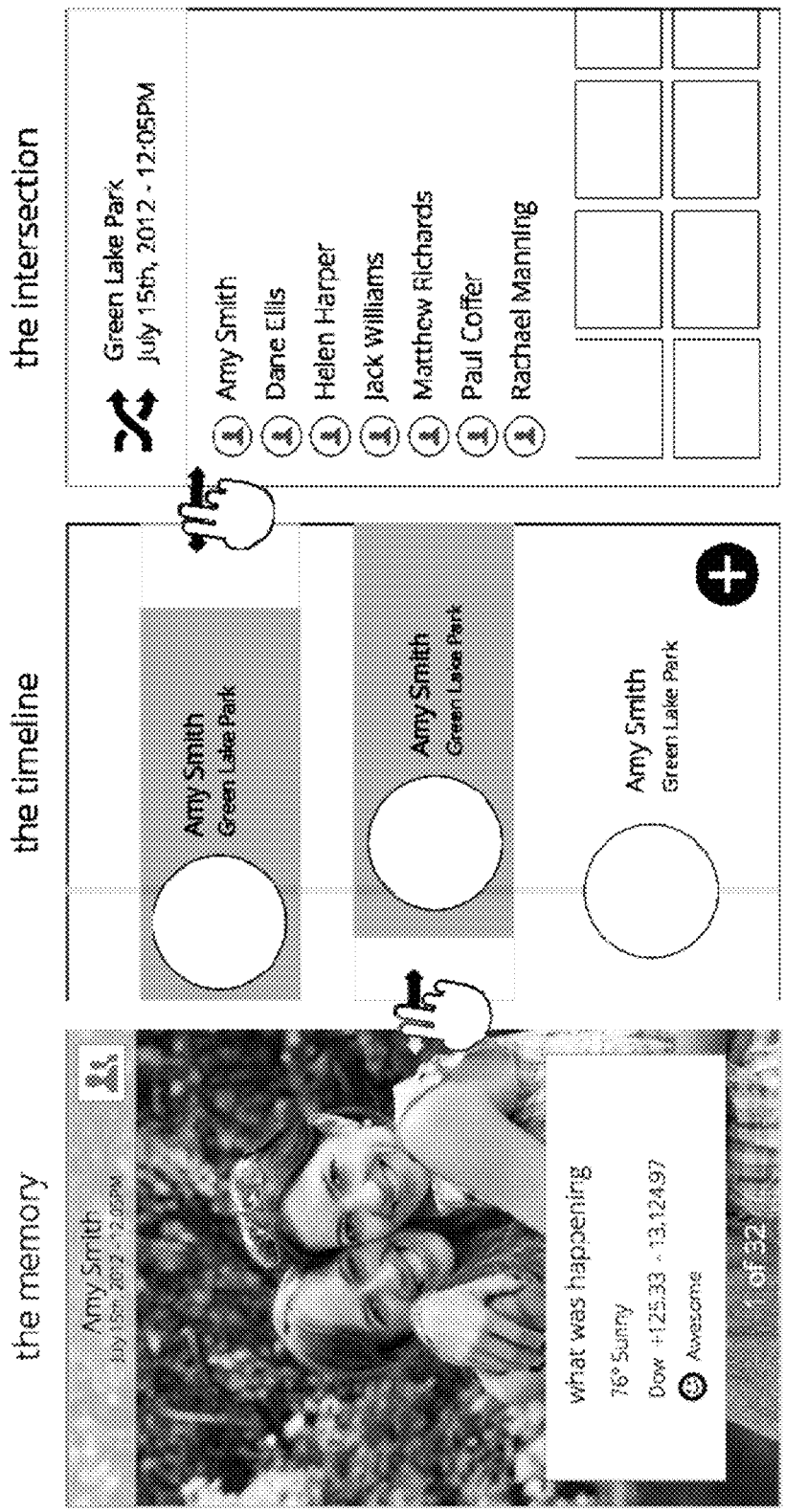
FIG. 14 is an illustration of an example mobile application interface for viewing additional details about the individuals associated with a virtual wall.

In the following discussion, many specific details are provided to set forth a thorough understanding of the present disclosure. It will be obvious, however, to those skilled in the art that the present disclosure may be practiced without the explicit disclosure of some specific details, and in some instances of this discussion with reference to the drawings, known elements have not been illustrated in order to not obscure the present disclosure in unnecessary detail. Such details concerning computer networking, software programming, telecommunications and the like may at times not be specifically illustrated as such are not considered necessary to obtain a complete understanding of the present disclosure, but are considered present nevertheless as such are considered to be within the skills of persons of ordinary skill in the art.

It is also noted that, unless indicated otherwise, all functions described herein may be performed in hardware, software, firmware, or some combination thereof. In some embodiments the functions may be performed by a processor, such as a computer system or an electronic data processor, in accordance with code, such as computer program code, software, and/or integrated circuits that are coded to perform such functions. Those skilled in the art will recognize that software, including computer-executable instructions, for implementing the functionalities of the present disclosure may be stored on a variety of computer-readable media including hard drives, compact disks, digital video disks, integrated memory storage devices and the like.

Furthermore, the following discussion is for illustrative purposes only, and discusses the present disclosure in reference to various embodiments which may perhaps be best utilized subject to the desires and subjective preferences of various users. One of ordinary skill in the art will, however, appreciate that the present disclosure may be utilized in a great variety of forms in media environments of any type. Unless explicitly stated, the method embodiments described herein are not constrained to a particular order or sequence.

Additionally, some of the described method embodiments or elements thereof can occur or be performed at the same point in time.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Turning now to the Figures of this application, various embodiments are shown. When the user installs a mobile Timeline application in accordance with this disclosure (e.g., onto a smart phone), Timeline can ask them to identify themselves by showing them a drop down list of contacts in their phone or other mobile device. If the software operating on the phone enables it, Timeline may attempt to select their contact. If it is not enabled, then Timeline may auto-complete as the user types in their name. The user can authorize their contact information to be sent to Timeline servers (herein also referred to has "system") so Timeline can associate their name, number, and email addresses with future interactions with other users. Since timeline can resurface memories based on significant dates, Timeline may also ask them for dates of significance. This may be presented as a drop down list of dates. Once checked, timeline may resurface memories. Example significant dates can include, but are not limited to, a birthday (checking this may show a date input field), an anniversary (checking this may show a date input field), and holidays.

Next, the process may begin to automatically populate the user's timeline. Timeline may attempt to find memories with which a user has already been associated by another user. This may be done a variety of ways. For example, via photo library scanning, which scans the user's photo album and identify photos that were taken at the same time and place as other Timeline users. Further, a list of possible intersections to the user based on the photo-library scan may be shown. Further, the list may be separated into people from the user's address book and those who are not. Photo recognition may be used to identify people in photos as possible tags.

Next, the user may be presented with a timeline of memories each with the burst of potential people to tag in the memory. Bursts are described in detail below. Each memory remains private until the user clicks on the people being suggested for tags. The user can also create a list of "always allow" tags that are automatically tagged.

A user's profile is created in parallel to their experiences in the timeline application. When they share via Facebook and Twitter, they may be asked if they want to Facebook connect. Timeline can then leverage their contacts on Facebook. For purposes of relevance, Facebook contacts are no more relevant than address book contacts.

In the final step of the startup experience, the user may be asked if they want to invite other users they have shared memories with in the past. This is not the same as gratuitously inviting "friends" to join. Rather, when a user sends an invitation to other individuals to join, they install the application, and when Timeline scans their memories (e.g. photos in their library), they add tags that potentially include the requesting user. This is a powerful feedback loop.

According to one process flow, installing Timeline may proceed as follows:

1. Welcome to timeline: A brief video may play showing: a personal memory being created, a shared memory being created, and a public memory being created.

2. Tell us who you are Timeline shows the user a contact picker so they can pick their name. At this point Timeline has their full information and can initiate a server process to identify any other memories they have been tagged in. This may in some embodiments happen asynchronously.

3. Let's create your first memory: present the user with the 'memory' screen allowing them to create a picture memory, a video memory, or a note memory.

4. Memories are associated with the real world: here we show the user a list of current 'world' relationships. Each choice has a check box associated with it so the user can turn on/off options they want associated with memories. For example, the weather, other users in their proximity, the stock market price, their mood (which they can set), etc.

5. Memory animates into the user's timeline.

Figure 20:
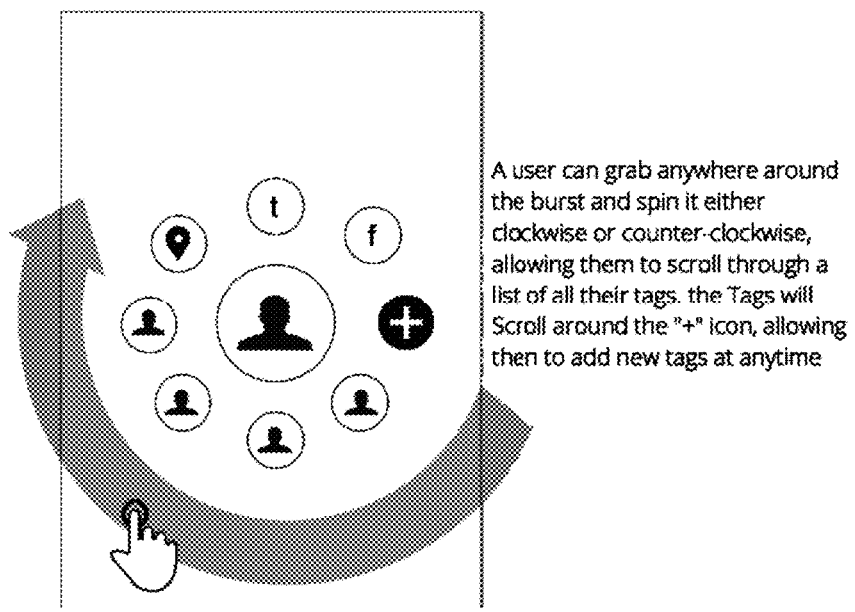
FIG. 20 is an illustration of an embodiment of scrolling through tags.

6. Congratulations! You have created your first memory. Memories are meant to be shared. Use the tag burst (see FIG. 20 generally) to tag other people you would like to share your memory with. The user may see the "+", which will take them to their people selector. Here they can select Facebook, Twitter, contacts from their address book, etc. Selecting Facebook or Twitter may initiate a process to connect to those services. From then on, the user does not have to set up the connection. They only need to select Facebook or Twitter, and memories will be cross posted. The user may also see the "p" marker for a place, which will lead to selecting the place associated with the memory. Clicking it the first time may notify the user that he can also associate the memory with the place he currently is. For example, a list of neighborhoods may be shown, or the user may be allowed to enter his own location. If the server has returned with a list of tagged memories, this may be used to show additional people in the tag burst—for example, people who shared memories with the user, which may imply that it's likely he'll want to do the same. Other members in proximity to the user may also be shown.

7. Timeline can also help a user find old memories. The user's photo album may now be searched for memories created. The user can pick which ones to share. Everything in timeline may default to being private until the user decides to share it. For example, Timeline may scan the user's photo album, send GPS coordinates from pictures to server, identify other users who were at the same place and time (e.g. from their list of GPS coordinates), and show a list of photos to the user and possible tags for them.

The user has now effectively configured their options for associated memory data, defined their smart tags, and created and shared memories (e.g., kicked off the feedback loop).

According to some embodiments, new users need to provide a phone number and verify that number. They may also have to provide an email address, but this does not have to be verified. Existing users may provide only an email address, and the email address needs to be already confirmed.

Typically either 0 or 1 phone number may be associated with an account at any time. When user A takes the phone number that used to belong to user B, it is possible for user B to have no phone number on his account. User B could've proactively changed his number through the profile. When existing user A takes a phone number that already has some memories, those memories the prior user may be untagged from the memories. Further, 1 or more emails may typically be associated with an account, of which 0 or more emails can be verified.

Application Startup

Figure 17:
FIG. 17 is an illustration of a first-time launch experience.
Figure 18:
FIG. 18 is an illustration of an embodiment of memory creation.
Figure 18:
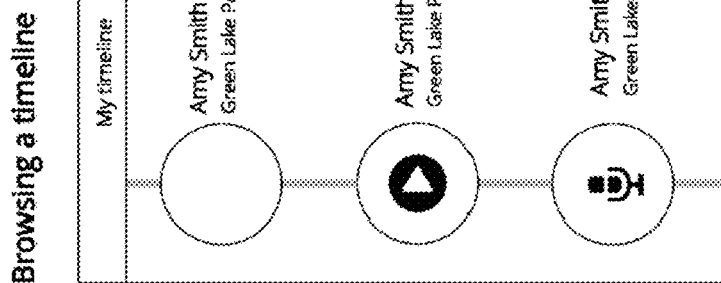
Figure 18:
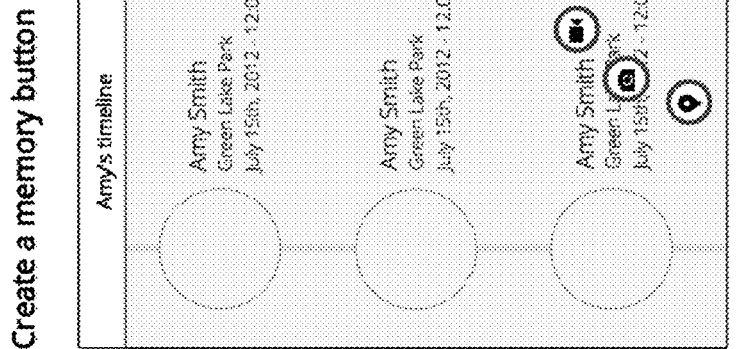
Figure 19:
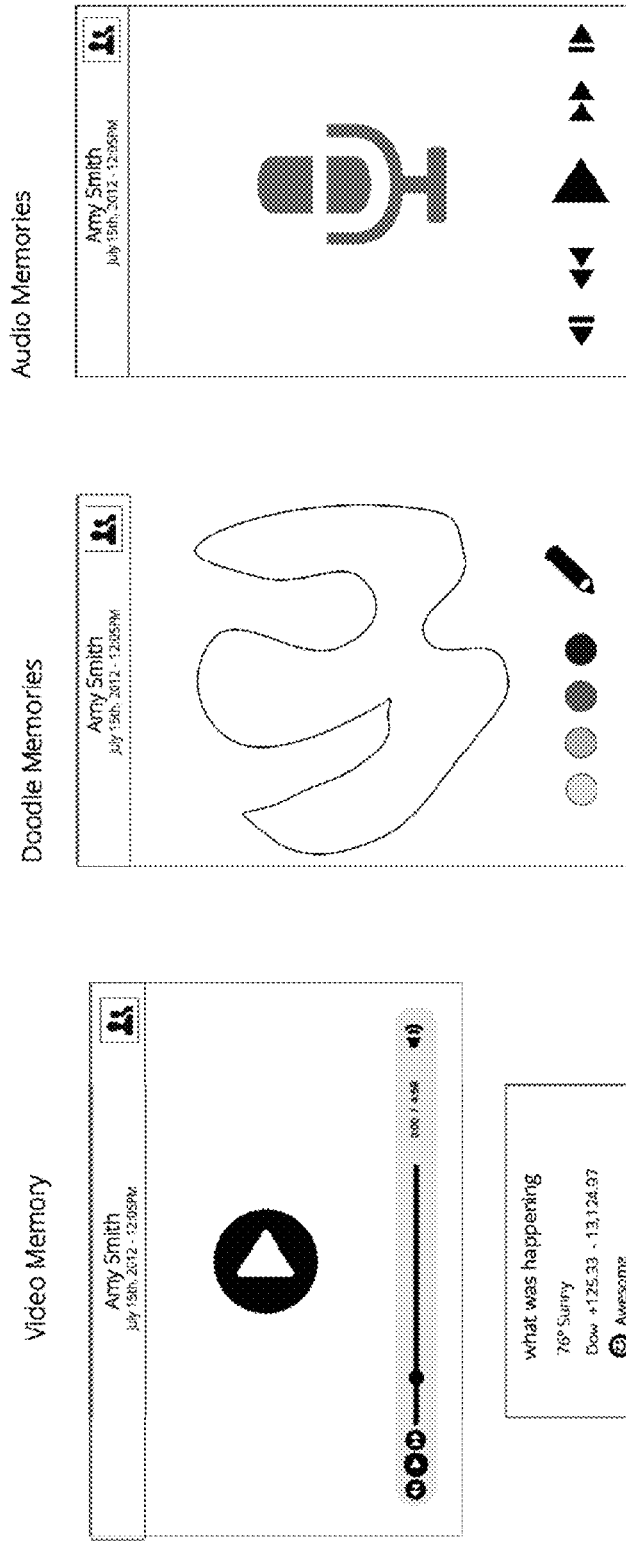
FIG. 19 is an illustration of some exemplary types of memories.

After initial setup, the mobile application can perform various steps when launched on the user's mobile device. FIG. 17 shows one such embodiment. These steps may include, but are not limited to downloading the latest list of walls, downloading the latest list of memorable places for the user (which may be useful in case the application is reset and loses this data locally), and scanning the photo stream to identify any new photos that were not taken in the app (which may trigger notifications suggesting to the user that they can add the memories and tag them).

According to some embodiments, a user's phone may be used instead of a name and password. This may simplify the process of registering for a service, because all that may be needed is a phone number.

The above features are described in detail below.

Memories

The types of memories that can be captured by Timeline include, but are not limited to photos, videos, notes (which may be distinguished from comments, since notes can be drawn by hand, and may also be referred to as doodles). All memories may have comments associated with them.

For purposes of illustration, refer to FIGS. 1, 2, 3, 7, 8, 9, 10, 11 12, 13, 14, 18, and 19.

According to some embodiments, users may be blocked from being included in a memory. For example, facial recognition may be used to determine that a user is in a memory that was just created. The may be notified and allowed to choose how and if the memory is created. He may choose to block the memory from being created, block the memory from being tagged with others, and/or have the system blot out his face from the memory, etc. According to another embodiment, convergence information may be used. If enough people tag Jason in a picture and Jason is using the application, the application may converge on who Jason is without full-fledged facial recognition.

This scenario may be advantageous for celebrities (for example) who want to use the application both for creating their own memories and for preventing others (e.g. paparazzi) from creating memories with them involved.

Resurfacing Memories

Timeline intelligently resurfaces memories based on location, time, and proximity to places and people. Memories may be resurfaced when a user is at a location they previously created a memory in. Memories may further be resurfaced when a user is at a location where a memory was created in which they were tagged in (e.g. Damon creates a memory in Times Square and tags his young son Liam. 20 years later, Liam may see the memory if he is in Times Square).

Various Resurfacing rules may be used. For example, the first time a user revisits a place they created the memory; the first time a user who was tagged in a memory revisits the place where the memory was created; the first time a user revisits a person they shared a memory with (e.g. they tagged a user or another user tagged them); and/or the anniversary of a memory.

Previews

Photo and video posts can be created with a preview so they can be viewed immediately. Previews contain thumbnails and low-res (or progressive) images for photos, and sequential still-frames for videos. The hi-res photos and videos may be sent up asynchronously in the background. The user may be asked if they want to allow uploading of the memories via 3G or only wireless.

Generating previews also helps with extracting frames from videos that may be used for photo recognition. The system may pull out frames, find faces within the frames, then leverage the crowd sourced tagging of people to build a database of facial patterns. This may help with identifying people and places within photos and videos. Facial recognition may be based on various types of visual information, such as photographs and videos (e.g. still frames captured from videos).

Locations

When a user creates a memory, the memory is tagged with the location. The user has the option of naming the location. Other users can see the name of the location. Additionally, the system can be configured such that the unique name given is only visible to users who have been tagged in the memory.

The following information, and various other types of information, may be associated with each memory at the time it is created: the current weather; the neighborhood; and walls.

Intersections

An intersection is quite simply a shared memory. Intersections are sometimes implicit (e.g. two people in the same photo) or explicit (e.g. User A tags User B in a memory so User B may see it). In general the following types of intersections may occur: with other people at the same place, with other people in the memory (e.g. in a picture), and with other people. It is understood that many types of intersections can be created, and not limited to the above.

Intersections can also occur at walls. An intersection is defined as a point in time that aggregates the posts from all people on the wall at that moment. The system can be configurable to define what constitutes a moment in regards to a wall. For example: number of people, a specific event, a specific time, or any other unique identifying attribute. For purposes of illustration, refer to FIGS. 8, 10, 11, 12, 14, 16, and 24.

Once a memory is created, the mobile application may immediately send a preview of the memory to the system. This may be used to generate the thumbnail for representation in the timeline as well as a low-res rendition of the memory. The full-res version of the memory can be uploaded in the background. Background uploading may enhance the user experience by, for example: including intelligence to not drain the battery (for example, only uploading when the app is in the foreground); including intelligence to not abuse data plans (for example, only uploading over wi-fi); including intelligence to upload a preview quickly so that previews are synchronously created (for example, in many public venues such as stadiums, bandwidth is extremely constrained, making it difficult to upload more than a few KB of data at a time).

Background uploading generally refers to the feature(s) that allow the present disclosure to process uploading of memories and tag information in the background. In many cases when, a user wants to create memories data reception is poor due to too many cell phones competing for limited bandwidth. This typically results in a number of challenges. Below are some example scenarios involving background uploading.

Uploading memories—a user is at a sports game and takes a picture of himself and his friends. Cached tags are suggested to the user, as well as connections that were in the vicinity when he last had reception. The user tags his friends in the picture. The application may then immediately return to the main UI so the user can create additional memories without waiting for the memory he just created to finish uploading.

At the same game, the user takes a picture of David Beckham. He goes on to create a few more memories. A few minutes later one of the guests in suite asks if the user can share the David Beckham memory with her. He opens the app, scrolls to the memory in the timeline, and clicks the scan tag. He tags the guest, which then connects her to him. The application may then return to the main UI and queue up the memory in the background to have additional tags added to it.

Leaving the game, the user is back in good cell coverage. The background uploads start processing. Tagged people are now receiving their notifications (and vice versa). The user is able to accept tags, comment on memories, and create new memories.

Typically, even with background uploading a user's timeline may always be synchronized in the time order. Older memories will be uploaded before newer ones are.

Uploading may occur in two passes. In the first pass, all memories that have not been synchronized may be reconciled with the server to tag information, and a preview image is uploaded. On the second pass, the full memory will be sent up. It may be advantageous to send memories serially. This will ensure that a timeline is not fragmented with some memories being available in full fidelity and prior memories only being available in preview.

Users may be allowed to choose whether or not to use cellular data. This will allow users on metered rate plans to avoid large bills by only synchronizing with the server over wifi.

It is possible for users to go back in their timelines to add tags to a memory. In this case, the memory tags will immediately be sent up to the server.

In cases of lost connectivity, the background uploader may poll for service or listen for an event that indicates uploading is possible. Uploading can begin at this point. In cases where memories were tagged without cell service, the server can enable retro-tagging, which suggests tags that would have been suggested for the memory had there in fact been service available when it was created.

Retro-tagging refers to going back to a memory in your timeline and adding tags to the memory. The system may keep track of who was near you at the time you created the memory, essentially enabling the full functionality of the suggested tag feature.

For example, if a user takes a picture at a party and doesn't bother to tag Damon, Jason, and Chase, all of whom were at the party with him and were suggested tags, the user may still see them as suggested tags when he goes back to the memory after the party.

Suggested tags that the server would have offered when a memory was created may be tracked in order to recreate them when a user goes back to add tags.

In cases where there is limited network connectivity, the suggested tags may be expanded upon by deducing who else was at the event when the user created the memory. This may be done by determining who else posted memories at the event that the user is connected to. This makes the suggested tag feature very powerful because it works after the fact and improves as more people post their memories.

Background uploading may be advantageous because memories may be available to the server to facilitate tagging and accepting of tags as fast as possible. Full fidelity is not needed for this.

Tagging

Tagging (also known as "adding") is a way of explicitly intersecting a user's memory with other people. When a user tags someone, the tagged user will receive an application notification. After the notification, the user can then accept the tag or remove it. If they accept the tag, they will see the memory in their 'feed'. The tagging user may then in some embodiments receive a notification that the tagged user has accepted. According to some embodiments, the creator of a memory may later delete the memory, which may revoke access to the memory from all tagged users. As an alternative, the tagging user may also simply untag selected tagged users, which may also revoke their access to the memory.

According to one embodiment, tagging may be effected by encapsulating the memory in a data structure. The data structure may then be associated with selected users, the association causing the data to be shared with those users.

According to some embodiments, a user may be restricted from tagging other users in a memory unless he has their contact information in his phone. According to some embodiments, having been previously tagged by another user may enable the first user to tag the other user.

Figure 21:
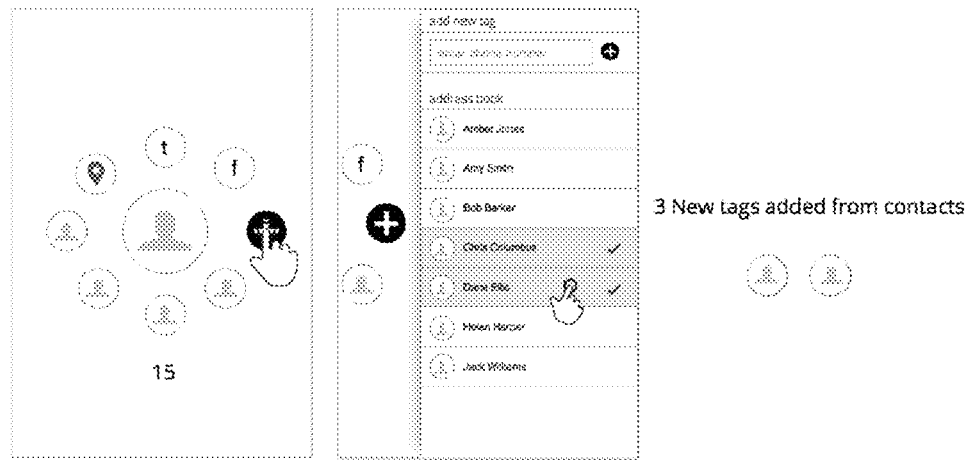
FIG. 21 is an illustration of an embodiment of adding tags from contacts and using a phone number.
Figure 21:
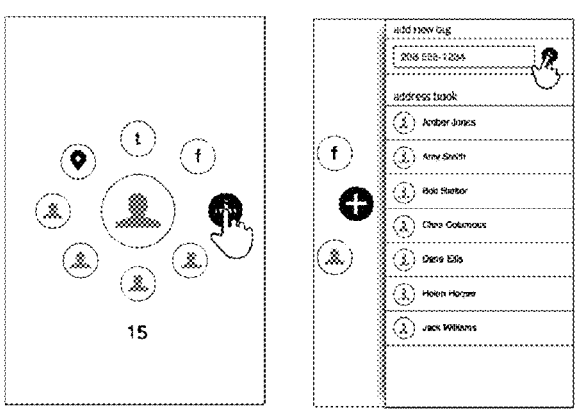
Figure 21:
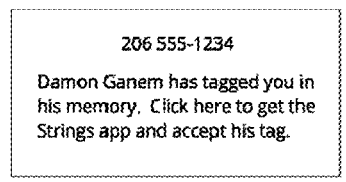
Figure 22:
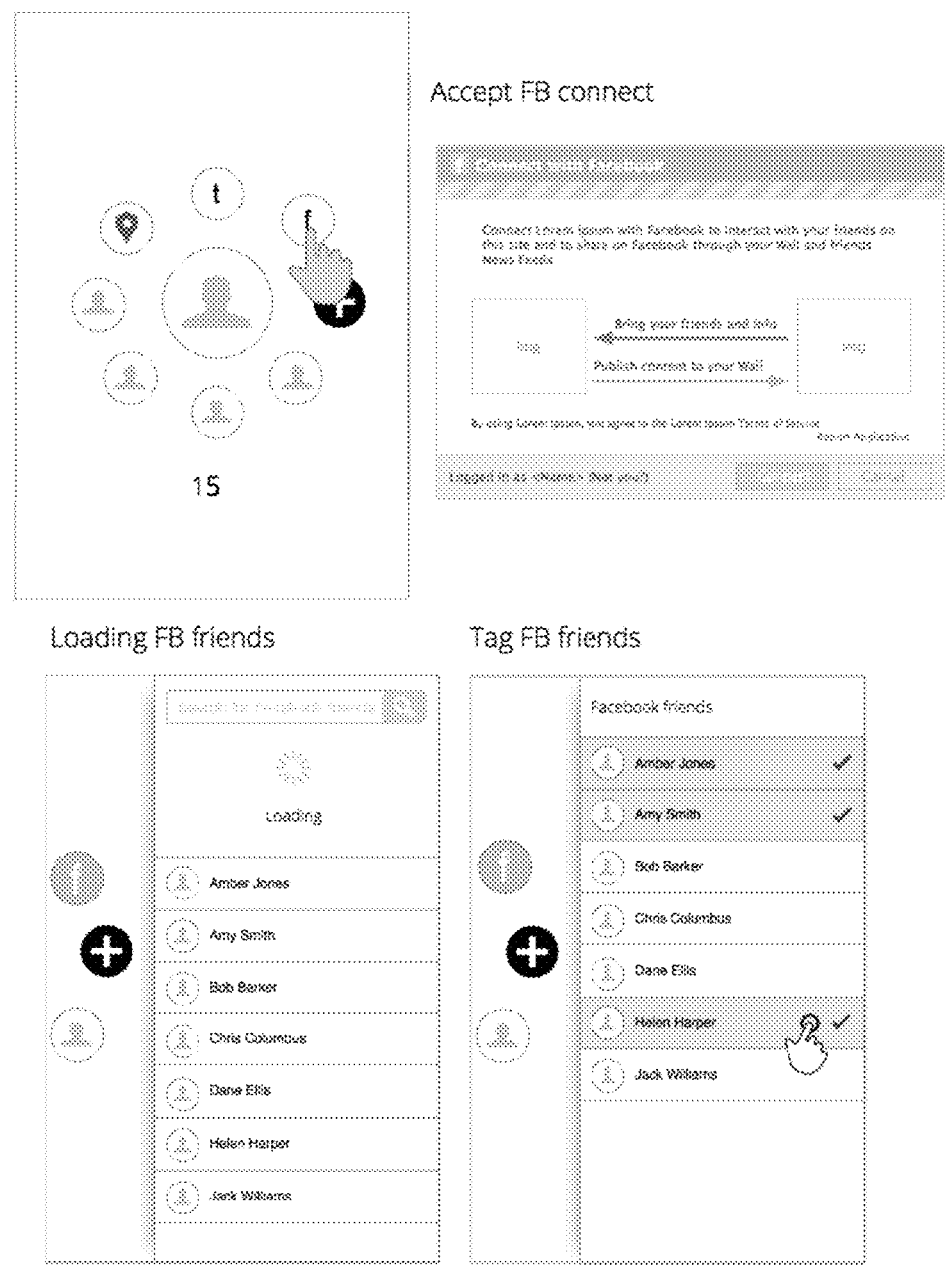
FIG. 22 is an illustration of an embodiment of tagging a Facebook contact.

Users can manually add tags by clicking on the "+" next to a memory. This may pull up their contact list which may include Facebook, Twitter, and their address book contacts. Tagging Facebook and Twitter will allow the user to post a memory to Facebook or Twitter directly. FIGS. 21-22 show exemplary embodiments of tagging users from contacts, via a phone number, and via Facebook.

If a user tags someone from their contacts who is not a user on Timeline, then their contact info is associated with the tag. Where possible Timeline will send a text message from the capturing user's device to the new user inviting them to join Timeline to view the memory in which they were tagged. The text message can include a link to the mobile application or to a website. Once the new user installs the application and enters their contact information, the tag is automatically matched to their contact info.

Figures 27, 28:
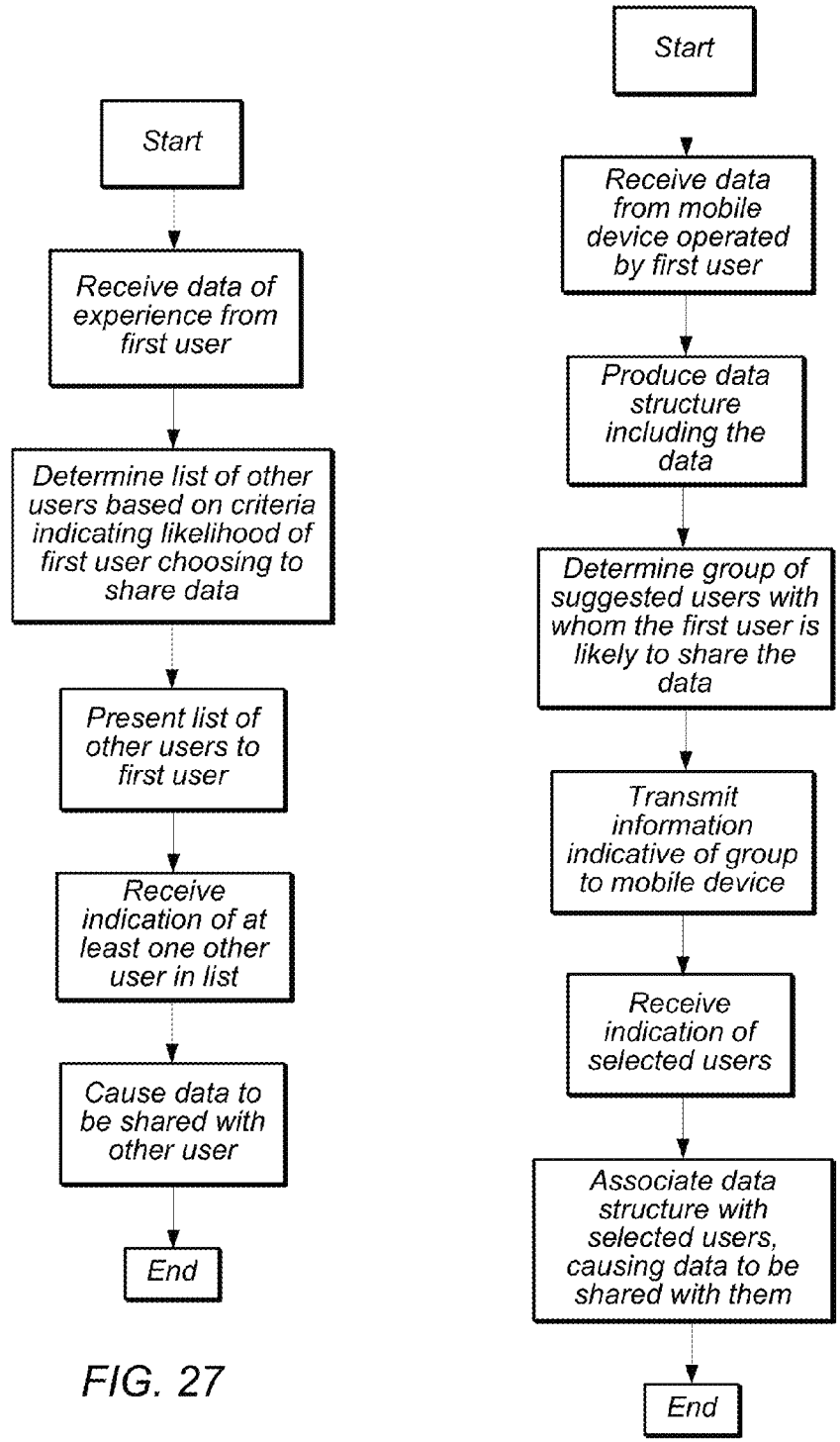
FIGS. 27-29 are illustrations of exemplary process flows for suggested tagging.
Figure 29:
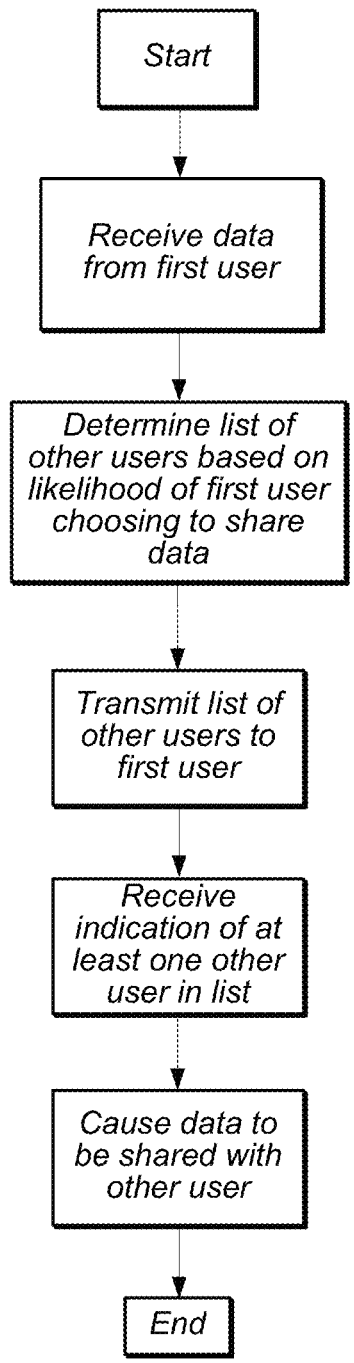

"Smart tagging" or "suggested tags" refers to the application automatically suggesting possible tags to the user and present those suggestions to the user. Smart tagging is typically based on one or more criteria indicating a likelihood that the user will choose to share a memory with other users. This may include proximity-based suggestions, which show people around the user at the time they create their memory. Timeline may default to people in their contacts or anyone who is on the site. Smart tagging may further include previous tag suggestions, i.e. people a user has frequently tagged in the past may be shown as tag options. Smart tagging may further include locality tags, which take advantage of the fact that users often use tags repeatedly when in the same location. For example, a user creating memories at home may typically tag the same group of people (e.g., his family) in those memories. Smart tagging may further take advantage of facial recognition, to determine who might be in a memory. Some embodiments of smart tagging process flows are shown in FIGS. 27-29.

This feature is meant to allow users to intuitively and easily tag people whom they would naturally share a memory with.

Various criteria may be used for different types of suggested tags. For example, people in your contacts with phone numbers (e.g., people who have shared contact information with you), people you know who are nearby, people you have tagged in the past, Facebook, Twitter, Walls, Scans (e.g., people you scan in), recognition (e.g., figuring out who is in a tag automatically, for example by using facial recognition or converging on who a person is by analyzing who else has tagged that person).

The suggested tags feature may optimize which tags to show in the most prominent positions spots, as well as the overall priority of all tags. For example, Damon tags Shanna in memories he creates with his son Liam even when Shanna is not nearby. Shanna may then become a consistent tag suggestion when Damon creates memories. If the application recognizes the picture is of Liam, then it may also suggest Shanna.

Likewise, people who are nearby whom you've tagged recently or whom you've tagged at that intersection may be suggested at a higher priority. If you never use Facebook or Twitter, then those might be excluded from the more prominent suggested tag positions. Further, Walls may have a special place in the tag burst so they are not lost.

Once the user confirms the other user or users from the suggested tags that he wishes to tag (optionally indicating additional users who should be tagged), the system may tag those users in the memory and cause it to be shared with them.

One aspect of this disclosure known as "Social Zones" may allow a user to define a geo-fenced area within which the user can be discovered by other users. In addition, this region defines the area within which the user can see other users. This geo-fencing allows users to turn off "location" services so they cannot be discovered in other applications, which may help preserve battery and protect privacy. If and when the user wants to interact with others nearby (e.g., within a selected geographical proximity, such as a circle having a 100-foot radius), they can turn on their social zone and define the radius and then discover other users who are also social within that radius.

According to one embodiment, a visual map metaphor may be used for this purpose. The user would see a map and could zoom in/out of this map area. This map would define their social zone. In addition, the user could turn off the social zone rendering them invisible to other users. If the social zone is turned on then users would see other users who are nearby. This could apply to nearby users, brands, walls, etc.

The Social Zone feature may in some embodiments be two-way. If it is on, you can discover others and they can discover you. If it is off, you cannot discover others and they cannot discover you.

A user can create surrogate tags to allow tagging of people who are not yet members of timeline. This makes it possible for a parent to create a tag for their child and to then populate memories in that child's timeline. When the child is old enough to inherit the tag, they can register for the service, inherit the tag, and then see all the memories that were created for them.

An example use case for surrogate tags might be as follows: Shanna Ganem is a new mother. She takes pictures of her son Liam on a daily basis. Since Liam is only a baby, when Shanna creates her first memory of Liam, she clicks on the "+" and then clicks on "create a surrogate tag." She now has a tag called Liam Ganem. Each time she tags Liam, Timeline may remember the tag location and suggest Liam as a tag going forward. Timeline may also use photo recognition to suggest Liam as a tag when it sees Liam in a photo. Since Liam is not a user on Timeline, his timeline will be maintained in surrogate for him. When he signs up for Timeline at a later date, he will have all the memories his mother created for him populated in his timeline.

Other possibilities exist for tagging non-users. For example, assume that Damon is a user on timeline, but Edward is not. They do not have each other's contact information. Damon and Edward are at a party together. Damon takes a picture of the two of them in Timeline and asks Edward if he wants to be part of the memory. Edward says yes. Damon asks Edward for his phone number. Damon hits "+" to add a new contact as a tag. He enters Edward's phone number. Edward receives a text message (or an email) to sign up and be part of the memory. Once signed up, Edward will have his timeline populated with the memory. Damon and Edward will also both have their contacts updated with each other's information.

As another example, assume that Damon is a user on timeline, and Edward is as well. Same scenario as above occurs. Damon hits "+" to add Edward in the memory. Damon enters Edward's phone number. Edward receives an in-app notification about the memory. Edward accepts. Damon and Edward now both have each other's contact information.

According to some embodiments, this disclosure may include suggesting tags for new users. When a user signs up for Timeline, their contacts may be uploaded to the timeline server. This is a restricted action on some phones, so instead of sending clear-text contact information, a hash of all the phone numbers in the user's contacts may be used. Each hash will be associated with a "contact record." When new users sign up, their phone number will be compared against other users' contact records. If there is a match, it may then be determined whether these users have created memories together. This may be done, for example, by checking to see if they created memories in the same place at the same time. If user A is the new user and user B is the current user, and they share memories, then A may be suggested B as a smart-tag when they review their timeline of memories. Likewise, B may receive an in-app notification telling them, for example, "User A just joined timeline. The following memories appear to be shared with A Would you like to auto-tag them?"

This feature may make it possible for new users to make the site richer by populating the timelines of existing users. This may encourage users to ask new friends to sign up. With each new friend that signs up, everyone may discover more shared memories. Further, when a new user signs up, there may be a ripple effect with other users, since any that have shared memories with this new user will be encouraged to tag him in their memories. As a result, tile new user shortly after signing up may be notified about existing users wanting to tag them in a memory. This is a powerful feedback effect for new users, since they will immediately see memories they were part of but don't have in their own timelines yet. This may be an advantageous way to use the ability to resurface memories. When a friend (e.g., a person whose contact information is already in a user's phone) joins the system, the user may receive a notification.

According to some embodiments, a user may select whether a particular memory (or all memories) should be treated as "locked" or "unlocked." In the case of an unlocked memory, users whom a first user has tagged in a memory may in turn tag other users. In a locked memory, only the creator of a memory may decide who is tagged.

Crowd Sourced Photo Recognition

As users are tagged in photos, the system may leverage the multiple photos to narrow down the users, then learn those users faces from multiple angles to improve the photo recognition. For example, a photo from a first user may include first visual information, and a photo from a second user may include second visual information indicating that a particular person is in both photos. The system may be configured to automatically identify users when memories have an associated video recording, through the use of facial recognition. The system may further be configured to automatically identify users when memories have an associated audio recording, through the use of voice identification.

For purposes of illustration, refer to FIGS. 3, 4, 5, and 6.

Notifications

A user can be notified when they are tagged in a memory. The mobile application is configurable to include in-app notifications. Notification can allow a user to view the memory that was created and that the user was associated with. Further, the user can comment on a memory. New comments on memories in which the user was tagged generate new notifications.

The following is an exemplary list of notifications. It is understood that additional notifications may be used as well. For example, notifications may include that: user is near a wall; user is near a previous memory (either one the user was tagged in or one the user created); user is close to someone they have previously shared a memory with; user has been tagged in a memory; a comment was made on a memory the user was tagged in; a relevant date has come up (e.g. it's the user's birthday or the user asked to be reminded about a memory at a time in the future). Other notification options can include, but are not limited to notifying a user when a memory they created has been visited by another user.

Figure 15:
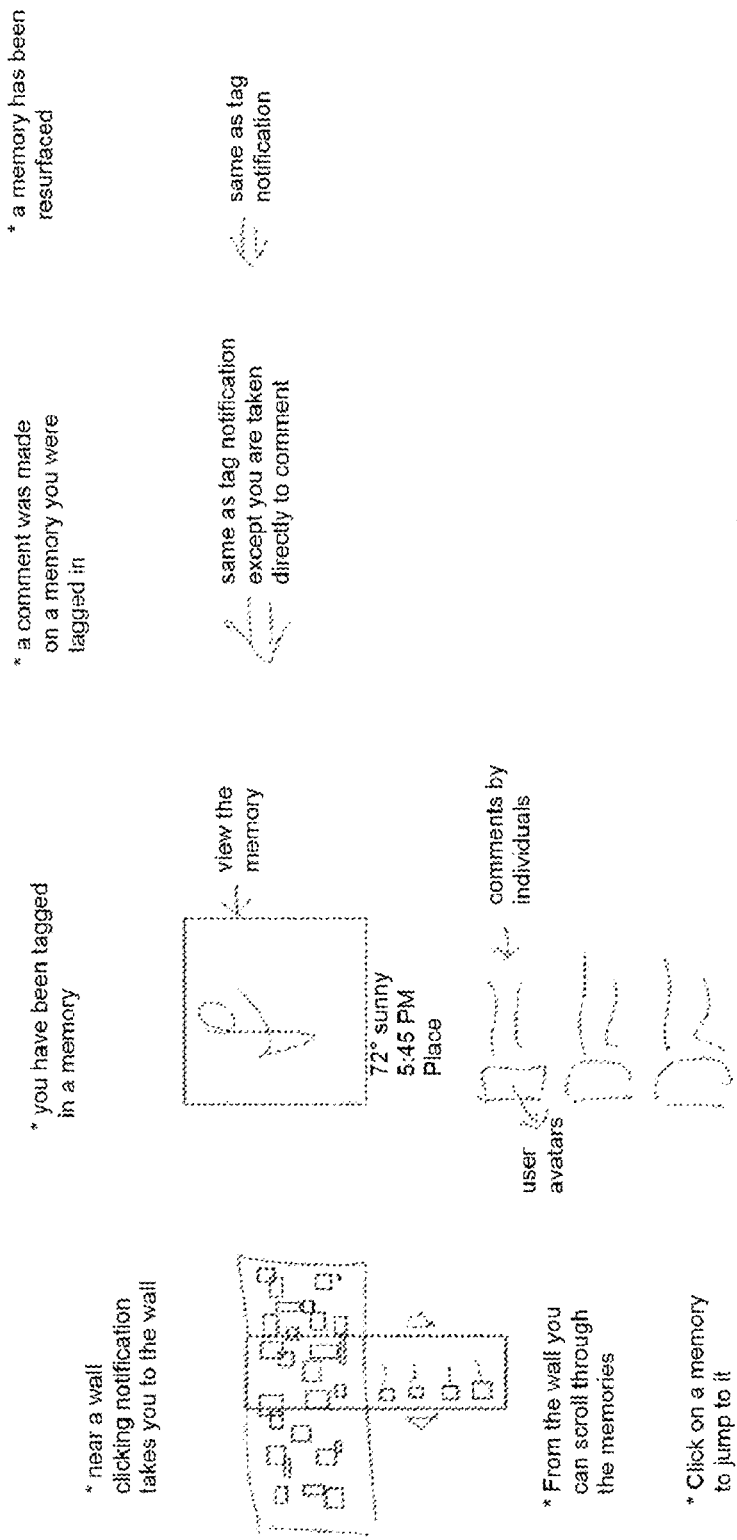
FIG. 15 is an illustration describing notification scenarios for individual users.
Figure 16:
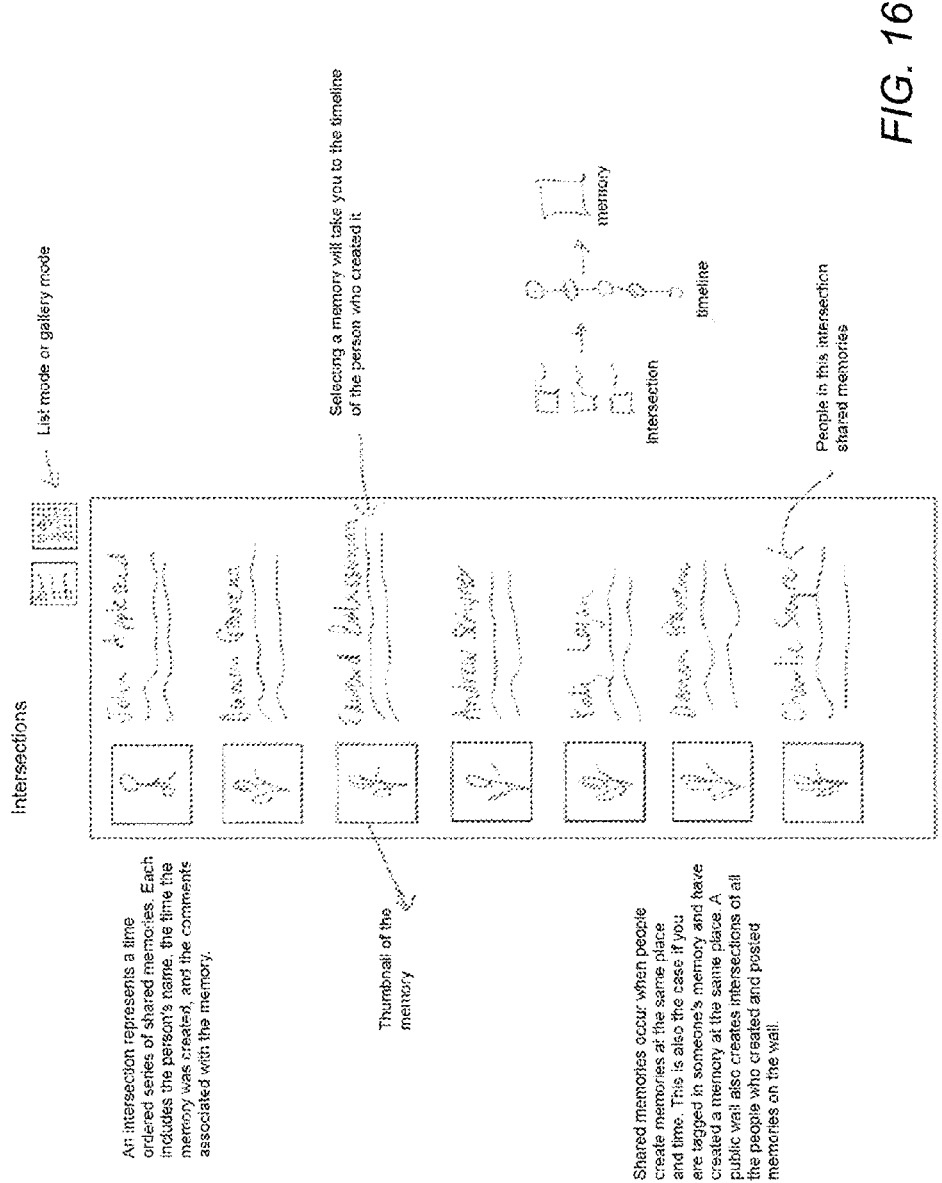
FIG. 16 is an illustration describing intersections between one or more individuals and one or more memories.
Figure 23:
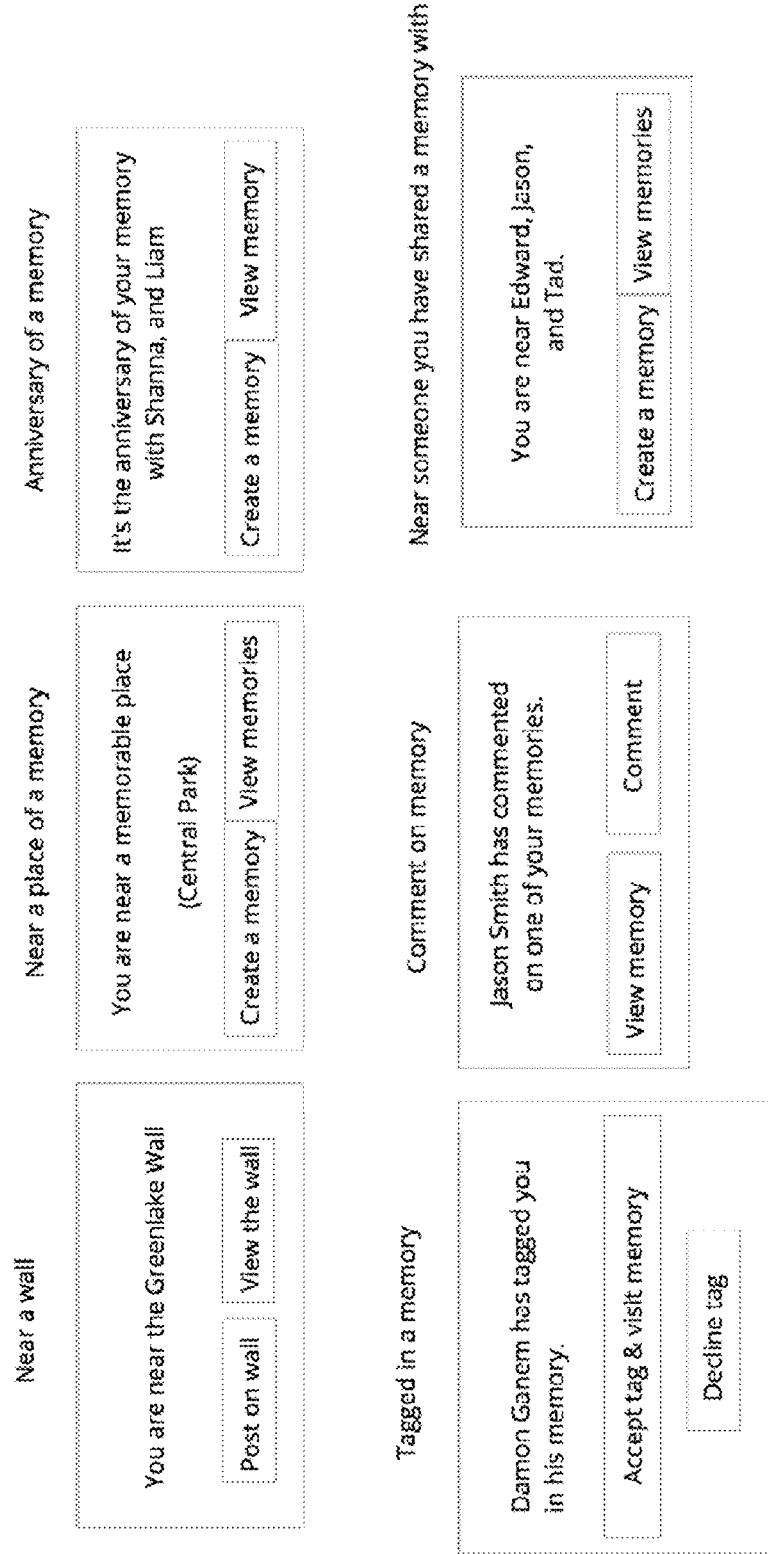
FIG. 23 is an illustration of some embodiments of user notifications.
Figure 24:
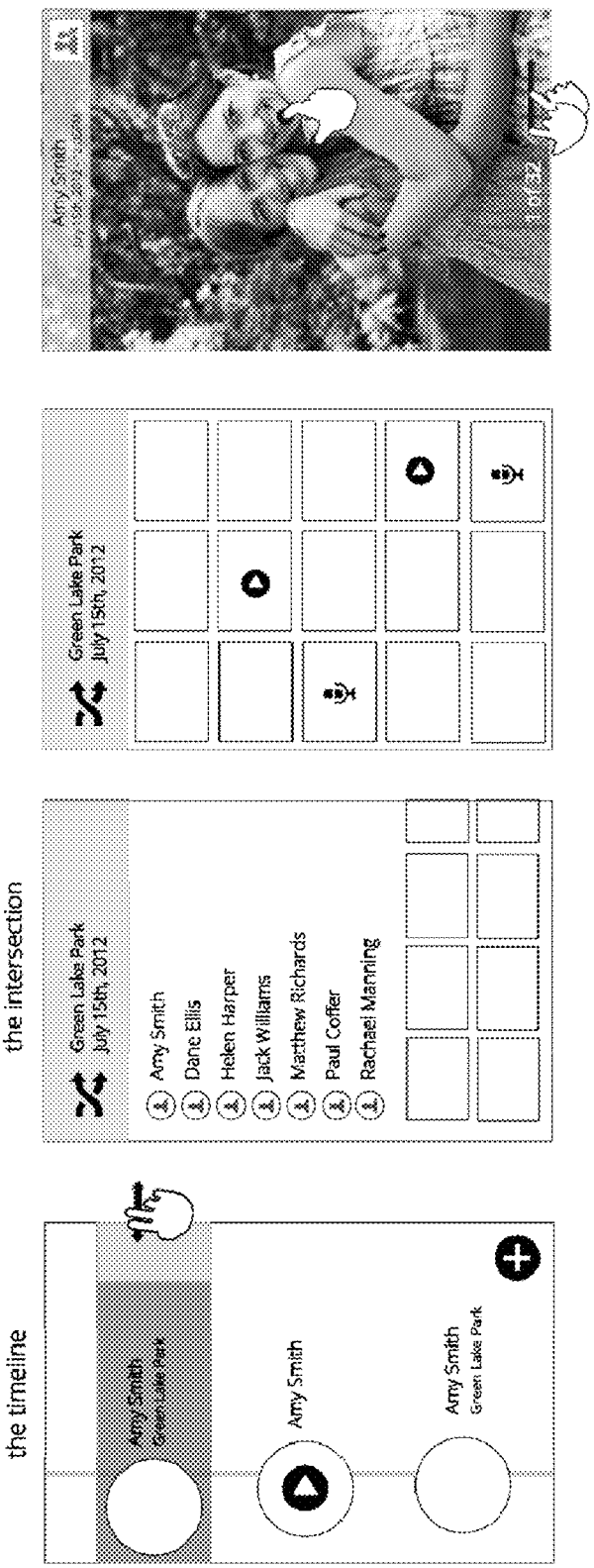
FIG. 24 is an illustration of a timeline intersection.

For purposes of illustration, refer to FIGS. 15 and 23.

Notification List

A section of the user interface can allow the user to see a list of incoming notifications that need to be acted on in a time independent manner. These can include tag requests, comment notifications, and photo scans.

Walls

Walls are a vehicle for sharing memories publicly. A wall represents the confluence of people and places at a particular location. Posting on a wall is a way of publicly capturing a memory. Users can tag people in the memory and that memory may then be resurfaced when they are in that location at a future point in time. According to some embodiments, posting memories to a wall may be restricted to users who are in physical proximity to the wall. Viewing of memories associated with the wall, however, may be enabled even for distant users.

Since walls are public, anyone can post on a memory they see on a wall. Commenting on a wall memory adds the user to the notification list for the memory. Any future comments on the memory may trigger a notification to the commenting user. The originator of the memory is also notified on any comments on a wall memory. Memories posted on walls can also include tags. Other users tagged in a wall memory may be notified of the tag.

For purposes of illustration, refer to FIGS. 8, 9, 10, 11 and 12.

Users may browse existing walls on a website. This will typically include public walls and brand walls. Clicking on a wall from the mobile browser will show the wall on the mobile device.

When a user is near a wall, he may be notified. According to some embodiments, not all walls will generate notifications for people nearby. Walls may be cached on the device so that a user may be notified about them without network connectivity. If a user tags a wall, he may become a fan of the wall. Brands who own or sponsor the wall may then tag the user back as a fan. Walls can have one or more sponsors and are typically associated with physical location. Wall administrators can change the physical location (e.g. an artist on tour can move his wall with him).

One or more brands or entities can sponsor a wall. Exclusivity on a wall allows a brand to be in complete control of the wall including its location and its fans. Sponsors will typically include brands that are physically located near the wall. When users tag a wall in a memory and become a fan, the wall sponsors can tag them back. Demographic data such as the fan's distance from the wall, the fans gender, frequency of visits to wall, etc. may be collected as well. A few example embodiments of walls might be as follows:

An artist as a wall: the artist can tag fans who tag his wall at concerts. The tag can include promotional music, photos, signed pictures (with the doodle feature), offers or other tools to engage his fans. Fans attending the concert will see the artist as a suggested tag when they create a memory.

Stadium as a Wall: a university may sponsor a wall for their sports team as an exclusive brand. This will allow them to tag fans who attend games with live photos and other memories that capture the game in real-time. Fans could also be tagged with promotional items such as coupons for concessions, etc.

Ground Zero as a Wall: a ground zero wall could be created that visitors of the memorial could tag when creating memories there. This type of wall might not have sponsors, or if it did they could be for the benefit of a charity.

Wall Games

The system can incorporate game dynamics into the wall in a way that leverages the public aspect of walls. Some examples may include, but are not limited to: give badges to people who frequent a wall the most; hide treasures related to local retail venues in the wall; incorporate trivia into the wall so when a user posts on the wall they are told a fact about the wall venue; and add fortune cookies to the wall so when a user posts they receive a fortune that is appropriate to the venue.

Timelines

Every user has a timeline that represents the memories they have created and their intersections. The timeline is shown in time order. Users can filter their timeline to include specific memories (either their own or those they have been intersected in). For purposes of illustration, refer to FIGS. 1, 2, 3, 11, 12 and 14.

Each node in the timeline can be configured to respond to specific gestures via a touchscreen interface that shows the people the memory was intersected with. These intersections can be explicit (the user added them when the memory was created), or implicit (they happened at the same time as others).

When a user swipes from a memory, they can see the intersection of that memory with other memories that were created at the same place and time. Swiping is the gesture of selecting a specific memory and either moving left or right to see additional information. The system may be configurable to enable swiping in any direction to load different information. This can be on a public wall or in a private group. Timeline shows the user the memories of people around them who tagged them in memories or that they tagged in memories at the same time. For purposes of illustration, refer to FIGS. 12, 13, and 14.

Intersecting Timelines

A user can view an intersection of multiple timelines. This shows a user a history of the memories that were shared between them and the other timelines they select. This may be accomplished by allowing a user to select people from a dropdown list that have shared memories with them. By default a user's timeline shows all their memories—both the ones they have created and the ones they have shared. They can turn on/off individual people from the timeline to only see the memories of specific people or they can filter to just themselves. For purposes of illustration, refer to FIGS. 8, 10, 11, 12, 14 and 16.

Profiles

People are not the emphasis in Timeline, memories are. When you install the application, we will ask you about your name, relevant dates such as your birthday, anniversary, etc. These are for the purposes of reminding you to make a memory. We do not ask you to tell us where you live, how old you are, what your bio is, where you worked, etc. Similarly it may be less useful for profile pages to make this type of information available to other users. The people you interact with in Timeline are people you interact with in the real world.

Figure 25:
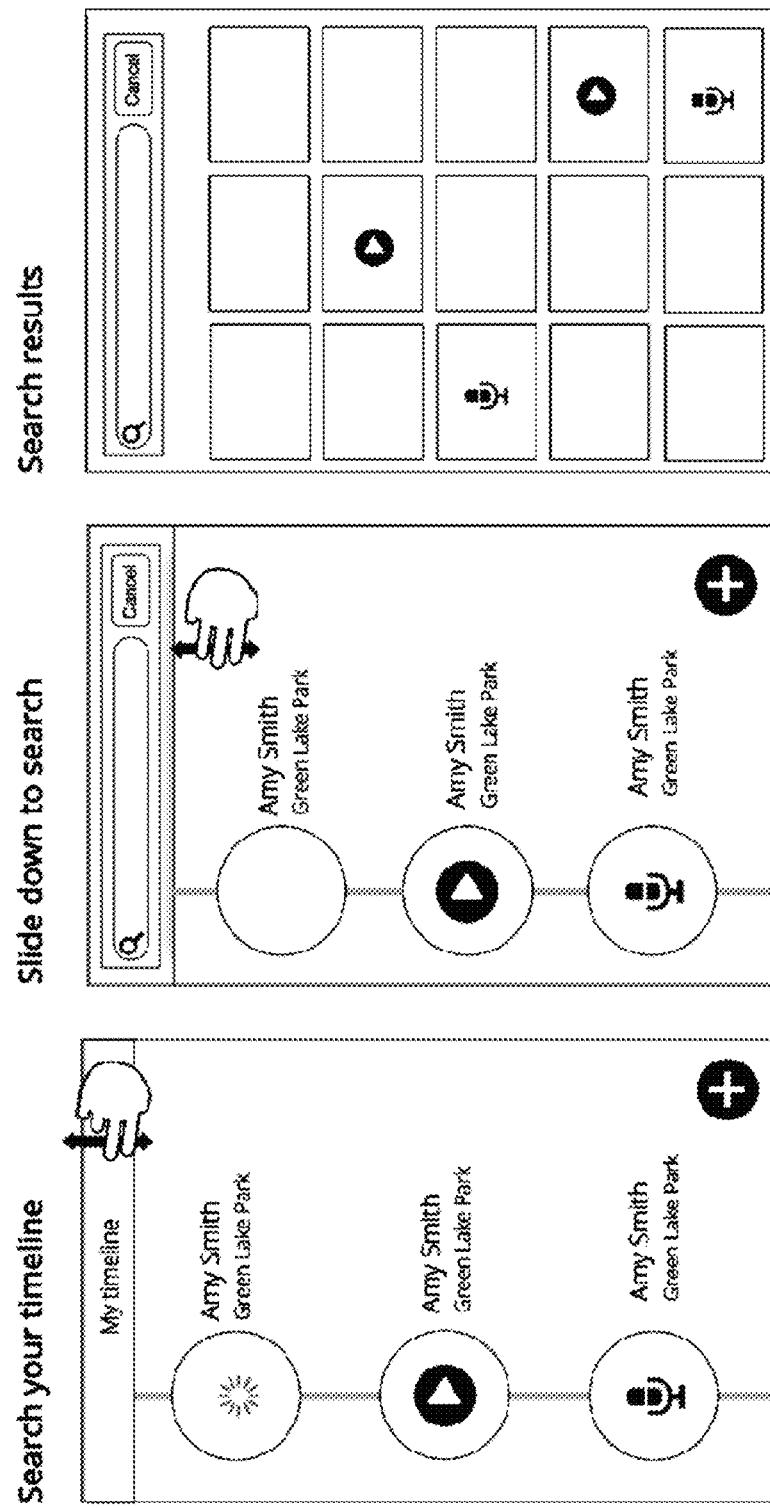
FIG. 25 is an illustration of searching a timeline.

Timelines may also be searchable in various ways. One goal of search is to allow a user to quickly find a memory. A user's timeline comprises all the memories they created or were tagged in. Memories are annotated with location data, user names, time/date, comments, camera information, etc. The search bar allows a user to do free-form search by typing in text that is matched to any of the attributes associated with a memory. The search bar may be implemented in an "intelligent" way, such that when a user begins typing in (for example) something that looks like a time, they are presented with a time picker. This allows the user to quickly enter search parameters from their phone. Likewise, if the user enters in text that matches a username or place name (or substring thereof), an autocomplete list of potential memories will be shown. This should make finding memories require minimal text input. See FIG. 25 for an illustration of one embodiment of Timeline search.

Since timeline tracks the intersection of people, place, and events, users may be able to filter their timelines based on any of these parameters. For example, by person: they may see their timeline filtered to a specific person so you can see all the memories you shared with them. Another example is by place: they may see their timeline filtered to a specific place showing you all the memories they had at that location. Another example may be by event: users may see their timeline filtered to a specific event (e.g. a date such as an anniversary) so they can see all the memories filtered to that event.

Users may also view their timeline on a map. Instead of being shown a linear presentation of their memories, their memories will be shown on a (for example) 2D map with the memories connected together graphically. A user can click on a memory, then tap to move to the next memory. This may be animated on the map. The search facilities described above can also be applied to the map view.

Privacy

By default, all memories are private. There is no implicit sharing of memories. This ensures that users never have a surprise. In addition, a user can only tag memories that they create. Further, one user cannot 'share' another user's memory with other people. This prevents the common social networking problem of a photo unexpectedly going public, even though it was shared privately.

The Timeline application encourages sharing by facilitating intuitive tagging. Timeline suggests people to tag that would intuitively make sense to share a memory with. If you do not tag people in a memory, the memory will remain private.

For purposes of illustration, refer to FIGS. 3, 4, 5, and 6.

User Options

Figure 26:
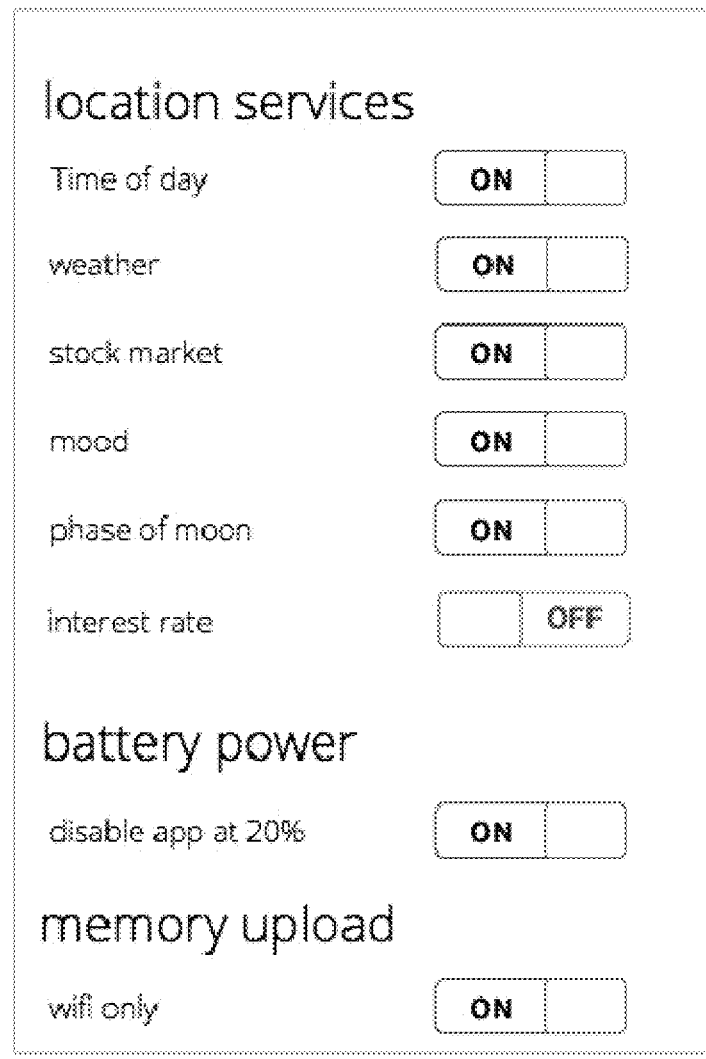
FIG. 26 is an illustration of a user options control panel.

Below are user options within an embodiment. It is understood that additional options, a reduced number of options, no options or a combination thereof can be utilized by any one of the user, application or system. FIG. 26 provides one example. In some embodiments, such options can include:
   location lookup—this enables the app to lookup information related to the location where a memory was created. Further, Timeline can have various parameters incorporated into this, including but not limited to:
      location
      time of the day
      weather
      stock market price
      mood (e.g. let the user pick a mood)
      phase of the moon
      current president
      interest rate
      headline news of the day
   notifications on/off
      wall notifications
      memory resurfacing
      comments
      tags
   proximity detection
      other users—e.g. we can keep track of other users who are nearby the user when they create a memory. This would be independent of who the user tags in a memory.
   memory upload
      wifi only—send memories to the server over wifi only
   low battery
      disable app at certain battery percentage
   connect to fitness apps (e.g. Nike running)

Information the Timeline system collects can be used to provide the user with insight into their lifestyles and how they related to their overall happiness. For example, Timeline can provide simple analytics that show the user trends, such as:
   who they are around when they have happy memories
   what time of day they generally have the happiest memories
   what the phase of the moon is when they are happiest
   heat map of locations they are the happiest at
   heat map of the weather patterns they are the happiest at According to some embodiments, various types of caching may be employed to avoid unnecessary server traffic. For example, memorable places may be stored in a list downloaded when the application starts. By keeping a list of memorable places (e.g. places the user created memories or was tagged in memories) the client can generate notifications related to resurfacing memories without having to ping the server. As another example, walls may be cached. The client may keep a list of all active walls. This will allow the client to notify the user about proximity to walls without having to ping the server.

Essentially Timeline can determine the correlation between the data it collects in order to help the user understand themselves better.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A method, comprising:
   a computer system receiving data from a first user of an information sharing service, wherein the data is associated with an experience of the first user;
   the computer system determining a list of other users of the information sharing service, wherein the list of other users is determined based on one or more criteria indicating a likelihood that the first user will choose to share the data with the other users, the one or more criteria including a determination of whether the other users have transmitted other data associated with the experience to the computer system;

the computer system presenting the list of other users to the first user;

the computer system receiving, from the first user, an indication of at least one other user included in the list; and the computer system causing the data to be shared with the at least one other user.

2. The method of claim 1, wherein the data is selected from the group consisting of:

a photo, a video, a note, and a drawing.

3. The method of claim 1, further comprising:

the computer system receiving, from the first user, an indication of an additional user of the information sharing service that is not included in the list; and in response to the indication, sharing the data with the additional user.

4. The method of claim 1, further comprising:

in response to an instruction from the first user, the computer system causing access to the data to be revoked from the at least one other user.

5. The method of claim 1, wherein the data includes first visual information, and wherein the one or more criteria include determining, based on facial recognition data obtained from the first visual information, that at least one of the other users appears in the first visual information.

6. The method of claim 5, wherein the facial recognition data is further obtained from second visual information supplied by a second user of the information sharing service, and wherein the second visual information indicates that the at least one of the other users appears in the first visual information.

7. The method of claim 1, wherein the list of other users is restricted to users who have shared contact information with the first user.

8. The method of claim 1, wherein the determining is further based on information regarding users of the information sharing service with whom the first user has previously shared different data within a selected period of time.

9. The method of claim 1, further comprising:

in response to an instruction from the first user, the computer system allowing the at least one other user to cause the data to be shared with a different user of the information sharing service.

10. The method of claim 1, wherein the one or more criteria include:

an indication that the first user is in possession of contact information for the other users; and an indication that the other users are within a specified geographical proximity to the first user.

11. An article of manufacture comprising a non-transitory computer-readable storage medium having instructions coded thereon, which, when executed by a server system, cause the server system to:

receive data from a mobile device operated by a first user of an information sharing service, the data being associated with an experience of the first user;

produce a data structure including the data;

determine a group of suggested users of the information sharing service with whom the first user is likely to choose to share the data, wherein the determining is based at least in part on the server system receiving other data from the suggested users associated with the experience;

transmit information indicative of the group of suggested users to the mobile device;

receive, from the mobile device, an indication of selected users with whom to share the data; and associate the data structure with the selected users, the association causing the data to be shared with the selected users.

12. The article of claim 11, wherein at least one particular user in the group of suggested users has previously caused different data to be shared with the first user within a selected period of time.

13. The article of claim 12, wherein the at least one particular user is within a specified geographical proximity to the first user at a time of creation of the different data.

14. The article of claim 11, wherein the group of suggested users is determined based at least in part on information regarding with whom the first user has previously shared different data.

15. The article of claim 14, wherein the group of suggested users is further based on information regarding who is within a specified geographical proximity to the first user at a time of creation of the data.

16. A non-transitory, computer-readable storage medium comprising instructions executable by a server system to:

receive data from a first user of an information sharing service, the data associated with an experience of the first user;

determine a list of other users of the information sharing service, wherein the list of other users is determined based on a likelihood that the first user will choose to share the data with the other users, the likelihood based at least in part on a determination of whether the other users have transmitted other data associated with the experience to the server system;

transmit the list of other users to the first user;

receive, from the first user, an indication of at least one other user included in the list; and cause the data to be shared with the at least one other user.

17. The non-transitory, computer-readable storage medium of claim 16, wherein the instructions further cause the server system to:

in response to the first user being within a specified geographical proximity to a particular location at a time of creation of the data, allow the first user to cause the data to be shared with an entity associated with the particular location.

18. The non-transitory, computer-readable storage medium of claim 17, wherein the instructions further cause the server system to:

in response to the first user causing the data to be shared with the entity, allow the entity to cause different data to be shared with the first user.

19. The non-transitory, computer-readable storage medium of claim 16, wherein the likelihood that the first user will choose to share the data with the other users is determined based at least in part on the other users being within a determined geographical area of the first user.

20. The non-transitory, computer-readable storage medium of claim 19, wherein the determined geographical area is a circle having a radius of 100 feet.

* * * * *